(12) United States Patent
Kawamura

(10) Patent No.: US 7,817,349 B2
(45) Date of Patent: Oct. 19, 2010

(54) ZOOM LENS AND IMAGING APPARATUS

(75) Inventor: Daiki Kawamura, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/395,200

(22) Filed: Feb. 27, 2009

(65) Prior Publication Data

US 2009/0231727 A1 Sep. 17, 2009

(30) Foreign Application Priority Data

Mar. 12, 2008 (JP) ............................ P2008-062416

(51) Int. Cl.
*G02B 15/14* (2006.01)
(52) U.S. Cl. ...................................... 359/688; 359/684
(58) Field of Classification Search ................. 359/683, 359/686, 688, 684
See application file for complete search history.

(56) References Cited

U.S. PATENT DOCUMENTS 5,798,872 A * 8/1998 Uzawa ........................ 359/686
7,589,909 B2 * 9/2009 Ikeda ........................ 359/688
2006/0146420 A1 7/2006 Yamada

FOREIGN PATENT DOCUMENTS

| JP | 6-337353 A | 12/1994 |
|---|---|---|
| JP | 2004-279726 A | 10/2004 |
| JP | 2006-47771 A | 2/2006 |
| JP | 2007-171248 A | 7/2007 |

* cited by examiner

*Primary Examiner*—Scott J Sugarman
(74) *Attorney, Agent, or Firm*—Birch, Stewart, Kolasch & Birch, LLP

(57) ABSTRACT

A zoom lens is provided and includes: in order from an object side thereof, a first group having a positive refractive power; a second group having a negative refractive power; a stop; a third group having a negative refractive power, the third group including at least two positive lenses and at least two negative lenses; and a fourth group having a positive refractive power. Power variation from a wide angle end to a telephoto end of the zoom lens is performed by moving the second group to an image side along an optical axis thereof, while the first group and the third group are fixed, and correction of an image plane caused by the power variation and focusing is performed by moving the fourth group along the optical axis.

13 Claims, 42 Drawing Sheets

FIG. 11

| | EXAMPLE 1 : BASIC LENS DATA | | | |
|---|---|---|---|---|
| Si | Ri | Di | Nej | νdj |
| 1 | 27.1468 | 0.40 | 1.85504 | 23.8 |
| 2 | 10.4547 | 2.01 | 1.49846 | 81.5 |
| 3 | ∞ | 0.03 | | |
| 4 | 13.7140 | 0.93 | 1.77621 | 49.6 |
| 5 | 37.3205 | 0.03 | | |
| 6 | 8.0262 | 1.11 | 1.73234 | 54.7 |
| 7 | 23.7465 | D7( VA ) | | |
| *8 | 48.2153 | 0.27 | 1.80820 | 40.4 |
| 9 | 1.6838 | 0.91 | | |
| 10 | -3.5154 | 0.18 | 1.83946 | 42.7 |
| 11 | 2.7287 | 0.81 | 1.93324 | 20.9 |
| 12 | -24.2201 | 0.00 | | |
| 13 | 5.8363 | 0.59 | 1.48914 | 70.4 |
| 14 | -37.3216 | D14( VA ) | | |
| 15( AD ) | ∞ | 0.50 | | |
| 16 | 16.2793 | 0.52 | 1.93432 | 18.9 |
| 17 | -8.2251 | 0.29 | | |
| 18 | -29.6642 | 0.79 | 1.49846 | 81.5 |
| 19 | -2.7681 | 0.15 | 1.91048 | 31.3 |
| 20 | -3.9853 | 0.29 | | |
| 21 | -3.2082 | 0.23 | 2.00994 | 25.5 |
| 22 | -115.1337 | D22( VA ) | | |
| 23 | -14.8137 | 0.17 | 1.85504 | 23.8 |
| 24 | 14.8137 | 0.75 | 1.48914 | 70.4 |
| 25 | -3.9071 | 0.02 | | |
| *26 | 3.8465 | 1.05 | 1.59041 | 60.4 |
| *27 | -3.4512 | D27( VA ) | | |
| 28 | -13.3885 | 0.23 | 1.88814 | 40.8 |
| 29 | ∞ | 0.13 | | |
| 30 | ∞ | 4.35 | 1.51872 | 64.2 |
| 31 | ∞ | 1.18 | | |

Si : SURFACE NUMBER
Ri : RADIUS OF CURVATURE
Di : SURFACE SPACING
Nej : REFRACTIVE INDEX
νdj : ABBE NUMBER
VA : VARIABLE
AD : APERTURE DIAPHRAGM
* : ASPHERICAL SURFACE

FIG. 12A

| AC | SURFACE NUMBER | |
|---|---|---|
| | EXAMPLE 1 : ASPHERICAL DATA | |
| | 8-TH SURFACE | |
| KA | 0.9009156 | |
| $RA_3$ | 1.4197670E+00 | |
| $RA_4$ | -2.5264214E+01 | |
| $RA_5$ | 3.3829715E+03 | |
| $RA_6$ | -6.8810229E+04 | |
| $RA_7$ | 1.6579669E+05 | |
| $RA_8$ | 8.1597043E+06 | |
| $RA_9$ | -7.6417687E+07 | |
| $RA_{10}$ | 1.4569526E+08 | |
| | 26-TH SURFACE | 27-TH SURFACE |
| KA | 1.2362981 | 0.8623296 |
| $RA_4$ | -5.8697826E+01 | 1.0490172E+02 |
| $RA_6$ | -2.3611111E+03 | -2.8923465E+03 |
| $RA_8$ | -1.4482123E+05 | 1.4422793E+05 |
| $RA_{10}$ | 8.7559523E+06 | |

AC : ASPHERICAL COEFFICIENT

FIG. 12B

| | f | FNo. | $2\omega$ | D7 | D14 | D22 | D27 |
|---|---|---|---|---|---|---|---|
| | EXAMPLE 1 : DATA CONCERNING ZOOMING | | | | | | |
| WE | 1.00 | 1.86 | 73.0 | 0.54 | 7.31 | 1.22 | 0.26 |
| TE | 11.50 | 1.87 | 7.0 | 6.63 | 0.95 | 1.13 | 0.34 |

WE : WIDE ANGLE END
TE : TELEPHOTO END

FIG. 13

| | EXAMPLE 2 : BASIC LENS DATA | | | | |
|---|---|---|---|---|---|
| | Si | Ri | Di | Nej | νdj |
| 10 | 1 | 27.9038 | 0.40 | 1.85504 | 23.8 |
| | 2 | 10.6125 | 2.01 | 1.49846 | 81.5 |
| | 3 | ∞ | 0.03 | | |
| | 4 | 14.2055 | 0.93 | 1.77621 | 49.6 |
| | 5 | 40.2151 | 0.03 | | |
| | 6 | 8.0098 | 1.10 | 1.73234 | 54.7 |
| | 7 | 23.5597 | D7( VA ) | | |
| 20 | *8 | 49.9160 | 0.27 | 1.80820 | 40.4 |
| | 9 | 1.6852 | 0.91 | | |
| | 10 | -3.5010 | 0.18 | 1.83946 | 42.7 |
| | 11 | 2.7265 | 0.82 | 1.93324 | 20.9 |
| | 12 | -21.9253 | 0.00 | | |
| | 13 | 5.7581 | 0.59 | 1.48914 | 70.4 |
| | 14 | -34.3275 | D14( VA ) | | |
| | 15( AD ) | ∞ | 0.50 | | |
| 30 | 16 | 17.6145 | 0.52 | 1.93432 | 18.9 |
| | 17 | -8.1642 | 0.29 | | |
| | 18 | -30.4907 | 0.79 | 1.49846 | 81.5 |
| | 19 | -2.7636 | 0.15 | 1.91048 | 31.3 |
| | 20 | -3.9639 | 0.29 | | |
| | 21 | -3.1653 | 0.23 | 2.00994 | 25.5 |
| | 22 | -110.9800 | D22( VA ) | | |
| 40 | 23 | -15.7636 | 0.17 | 1.85504 | 23.8 |
| | 24 | 15.7636 | 0.75 | 1.48914 | 70.4 |
| | 25 | -3.9071 | 0.02 | | |
| | *26 | 3.8573 | 1.05 | 1.59041 | 60.4 |
| | *27 | -3.4479 | D27( VA ) | | |
| 50 | 28 | -13.2383 | 0.23 | 1.88814 | 40.8 |
| | 29 | ∞ | 0.13 | | |
| P | 30 | ∞ | 4.35 | 1.51872 | 64.2 |
| | 31 | ∞ | 1.18 | | |

Si : SURFACE NUMBER
Ri : RADIUS OF CURVATURE
Di : SURFACE SPACING
Nej : REFRACTIVE INDEX
νdj : ABBE NUMBER
VA : VARIABLE
AD : APERTURE DIAPHRAGM
* : ASPHERICAL SURFACE

FIG. 14A

| AC | EXAMPLE 2 : ASPHERICAL DATA | |
|---|---|---|
| | SURFACE NUMBER | |
| | 8-TH SURFACE | |
| KA | 0.9009156 | |
| $RA_3$ | 1.3583742E+00 | |
| $RA_4$ | -2.3395510E+01 | |
| $RA_5$ | 3.4040199E+03 | |
| $RA_6$ | -6.8897515E+04 | |
| $RA_7$ | 1.6374393E+05 | |
| $RA_8$ | 8.1517113E+06 | |
| $RA_9$ | -7.6349335E+07 | |
| $RA_{10}$ | 1.4715899E+08 | |
| | 26-TH SURFACE | 27-TH SURFACE |
| KA | 1.2413231 | 0.8594419 |
| $RA_4$ | -5.7487313E+01 | 1.0678705E+02 |
| $RA_6$ | -2.3090240E+03 | -2.9330618E+03 |
| $RA_8$ | -1.4513744E+05 | 1.4428179E+05 |
| $RA_{10}$ | 8.7493932E+06 | |

AC : ASPHERICAL COEFFICIENT

FIG. 14B

| EXAMPLE 2 : DATA CONCERNING ZOOMING | | | | | | | |
|---|---|---|---|---|---|---|---|
| | f | FNo. | 2ω | D7 | D14 | D22 | D27 |
| WE | 1.00 | 1.86 | 69.4 | 0.27 | 7.29 | 1.23 | 0.26 |
| TE | 11.50 | 1.87 | 6.4 | 6.72 | 0.84 | 1.34 | 0.32 |

WE : WIDE ANGLE END
TE : TELEPHOTO END

FIG. 15

| | EXAMPLE 3 : BASIC LENS DATA | | | |
|---|---|---|---|---|
| Si | Ri | Di | Nej | νdj |
| 1 | 281.0091 | 0.40 | 1.92675 | 32.3 |
| 2 | 10.7455 | 2.11 | 1.49846 | 81.5 |
| 3 | -24.7483 | 0.03 | | |
| 4 | 11.6144 | 1.05 | 1.67701 | 57.8 |
| 5 | 58.0564 | 0.03 | | |
| 6 | 8.0074 | 1.11 | 1.68017 | 57.6 |
| 7 | 28.1069 | D7( VA ) | | |
| *8 | 15.7996 | 0.27 | 1.80820 | 40.4 |
| 9 | 1.6972 | 0.89 | | |
| 10 | -3.4150 | 0.17 | 1.83946 | 42.7 |
| 11 | 2.7924 | 0.76 | 1.93324 | 20.9 |
| 12 | -19.7339 | 0.00 | | |
| 13 | 5.8307 | 0.58 | 1.48914 | 70.4 |
| 14 | 1258.1333 | D14( VA ) | | |
| 15( AD ) | ∞ | 0.35 | | |
| 16 | 21.7031 | 0.50 | 1.93432 | 18.9 |
| 17 | -6.7826 | 0.29 | | |
| 18 | -21.3269 | 0.77 | 1.48915 | 70.2 |
| 19 | -2.7660 | 0.15 | 1.91048 | 31.3 |
| 20 | -4.0207 | 0.29 | | |
| 21 | -3.1424 | 0.23 | 2.00994 | 25.5 |
| 22 | -27.2927 | D22( VA ) | | |
| 23 | -11.1685 | 0.35 | 1.85504 | 23.8 |
| 24 | 11.1685 | 0.74 | 1.48914 | 70.4 |
| 25 | -3.8320 | 0.02 | | |
| *26 | 3.8453 | 1.03 | 1.59041 | 60.4 |
| *27 | -3.4530 | D27( VA ) | | |
| 28 | -15.5342 | 0.23 | 1.88814 | 40.8 |
| 29 | ∞ | 0.13 | | |
| 30 | ∞ | 4.35 | 1.51872 | 64.2 |
| 31 | ∞ | 1.18 | | |

Si : SURFACE NUMBER
Ri : RADIUS OF CURVATURE
Di : SURFACE SPACING
Nej : REFRACTIVE INDEX
νdj : ABBE NUMBER
VA : VARIABLE
AD : APERTURE DIAPHRAGM
* : ASPHERICAL SURFACE

FIG. 16A

| AC | EXAMPLE 3 : ASPHERICAL DATA | |
|---|---|---|
| | SURFACE NUMBER | |
| | 8-TH SURFACE | |
| KA | 0.9008776 | |
| $RA_3$ | 1.2754702E+00 | |
| $RA_4$ | -8.0443855E+01 | |
| $RA_5$ | 4.5564412E+03 | |
| $RA_6$ | -7.6291224E+04 | |
| $RA_7$ | 1.2928701E+05 | |
| $RA_8$ | 8.9022502E+06 | |
| $RA_9$ | -8.9160834E+07 | |
| $RA_{10}$ | 2.2670345E+08 | |
| | 26-TH SURFACE | 27-TH SURFACE |
| KA | 1.1617803 | 0.9400189 |
| $RA_4$ | -4.9799886E+01 | 1.1492740E+02 |
| $RA_6$ | -3.2696799E+03 | -4.1430202E+03 |
| $RA_8$ | -1.8309214E+05 | 1.7052356E+05 |
| $RA_{10}$ | 1.0352060E+07 | |

AC : ASPHERICAL COEFFICIENT

FIG. 16B

| EXAMPLE 3 : DATA CONCERNING ZOOMING | | | | | | | |
|---|---|---|---|---|---|---|---|
| | f | FNo. | 2ω | D7 | D14 | D22 | D27 |
| WE | 1.00 | 1.86 | 73.0 | 0.26 | 7.00 | 1.29 | 0.25 |
| TE | 11.50 | 1.86 | 7.0 | 6.75 | 0.52 | 1.24 | 0.30 |

WE : WIDE ANGLE END
TE : TELEPHOTO END

FIG. 17

| | EXAMPLE 4 : BASIC LENS DATA | | | | |
|---|---|---|---|---|---|
| | Si | Ri | Di | Nej | νdj |
| 10 | 1 | 29.4916 | 0.55 | 1.88814 | 40.8 |
| | 2 | 8.3070 | 1.47 | | |
| | 3 | 54.3911 | 0.66 | 1.61732 | 60.6 |
| | 4 | 16.0484 | 3.61 | | |
| | 5 | 14.3662 | 2.53 | 1.49846 | 81.5 |
| | 6 | -17.2553 | 0.03 | | |
| | 7 | 15.0628 | 0.46 | 1.92599 | 34.5 |
| | 8 | 7.4904 | 2.16 | 1.49846 | 81.5 |
| | 9 | ∞ | 0.03 | | |
| | 10 | 13.5377 | 1.48 | 1.75844 | 52.3 |
| | 11 | -46.3540 | D11 ( VA ) | | |
| 20 | *12 | -23.0106 | 0.36 | 1.80820 | 40.4 |
| | 13 | 2.2897 | 0.36 | | |
| | 14 | 2.7164 | 0.63 | 1.48915 | 70.2 |
| | 15 | 21.2534 | 0.43 | | |
| | 16 | -6.5185 | 0.23 | 1.89932 | 38.6 |
| | 17 | 3.3383 | 1.51 | 1.93138 | 19.0 |
| | 18 | -52.1143 | D18 ( VA ) | | |
| | 19 AD ) | ∞ | 0.73 | | |
| 30 | 20 | -5.1234 | 0.23 | 1.49846 | 81.5 |
| | 21 | 5.7801 | 0.93 | 1.87651 | 21.8 |
| | 22 | -7.6137 | 0.22 | | |
| | 23 | 6.1775 | 1.20 | 1.49846 | 81.5 |
| | 24 | -4.4825 | 0.20 | 2.00994 | 25.5 |
| | 25 | -8.0401 | 0.30 | | |
| | 26 | -5.9931 | 0.27 | 1.93137 | 19.0 |
| | 27 | 14.1001 | D27 ( VA ) | | |
| 40 | 28 | -65.3230 | 0.27 | 1.93137 | 19.0 |
| | 29 | 65.3230 | 0.98 | 1.49846 | 81.5 |
| | 30 | -5.0994 | 0.02 | | |
| | *31 | 5.5538 | 1.15 | 1.59041 | 60.4 |
| | *32 | -8.8966 | D32 ( VA ) | | |
| 50 | 33 | -23.3026 | 0.56 | 1.93137 | 19.0 |
| | 34 | ∞ | 0.15 | | |
| P | 35 | ∞ | 4.97 | 1.51872 | 64.2 |
| | 36 | ∞ | 2.30 | | |

Si : SURFACE NUMBER  νdj : ABBE NUMBER
Ri : RADIUS OF CURVATURE  VA : VARIABLE
Di : SURFACE SPACING  AD : APERTURE DIAPHRAGM
Nej : REFRACTIVE INDEX  * : ASPHERICAL SURFACE

FIG. 18A

| EXAMPLE 4 : ASPHERICAL DATA | | |
|---|---|---|
| AC | SURFACE NUMBER | |
| | 12-TH SURFACE | |
| KA | 0.8996133 | |
| $RA_3$ | 4.4850613E-01 | |
| $RA_4$ | 4.2112124E+01 | |
| $RA_5$ | -4.9389087E+01 | |
| $RA_6$ | -2.9302190E+02 | |
| $RA_7$ | 1.0880064E+04 | |
| $RA_8$ | 2.4676553E+05 | |
| $RA_9$ | -9.6349933E+06 | |
| $RA_{10}$ | 6.2026968E+07 | |
| | 31-TH SURFACE | 32-TH SURFACE |
| KA | 1.2721988 | 0.7882985 |
| $RA_4$ | -1.6929000E+01 | 1.0250108E+01 |
| $RA_6$ | -4.4594510E+02 | -5.6285236E+02 |
| $RA_8$ | -1.0878486E+04 | 1.7030834E+04 |
| $RA_{10}$ | 7.2265703E+05 | |

AC : ASPHERICAL COEFFICIENT

FIG. 18B

| EXAMPLE 4 : DATA CONCERNING ZOOMING | | | | | | | |
|---|---|---|---|---|---|---|---|
| | f | FNo. | 2ω | D11 | D18 | D27 | D32 |
| WE | 1.00 | 1.86 | 80.8 | 0.56 | 9.35 | 2.00 | 0.33 |
| TE | 11.50 | 2.24 | 7.8 | 9.27 | 0.64 | 2.09 | 0.25 |

WE : WIDE ANGLE END
TE : TELEPHOTO END

FIG. 19

| | EXAMPLE 5 : BASIC LENS DATA | | | | |
|---|---|---|---|---|---|
| | Si | Ri | Di | Nej | νdj |
| 10 | 1 | 75.6671 | 0.43 | 1.88814 | 40.8 |
| | 2 | 8.4008 | 2.90 | | |
| | 3 | 10.8368 | 2.19 | 1.49846 | 81.5 |
| | 4 | -22.9571 | 0.03 | | |
| | 5 | 13.8857 | 0.43 | 1.88730 | 39.8 |
| | 6 | 6.5527 | 1.94 | 1.49846 | 81.5 |
| | 7 | ∞ | 0.03 | | |
| | 8 | 11.2499 | 1.31 | 1.75844 | 52.3 |
| | 9 | -45.6327 | D9( VA ) | | |
| 20 | *10 | -31.175 | 0.31 | 1.80820 | 40.4 |
| | 11 | 1.8949 | 0.32 | | |
| | 12 | 2.3164 | 0.55 | 1.48915 | 70.2 |
| | 13 | 17.2192 | 0.38 | | |
| | 14 | -3.9557 | 0.20 | 1.91748 | 33.8 |
| | 15 | 2.8397 | 1.32 | 1.93432 | 18.9 |
| | 16 | -11.5266 | D16( VA ) | | |
| | 17 AD ) | ∞ | 0.64 | | |
| 30 | 18 | -3.9266 | 0.23 | 1.49846 | 81.5 |
| | 19 | 4.7667 | 1.02 | 1.86499 | 23.9 |
| | 20 | -6.1402 | 0.20 | | |
| | 21 | 4.5296 | 1.05 | 1.49846 | 81.5 |
| | 22 | -3.9139 | 0.18 | 2.00994 | 25.5 |
| | 23 | -7.5291 | 0.26 | | |
| | 24 | -5.6584 | 0.25 | 1.92756 | 19.2 |
| | 25 | 9.0837 | D25( VA ) | | |
| 40 | 26 | -115.9994 | 0.26 | 1.93137 | 19.0 |
| | 27 | 115.9994 | 0.86 | 1.48915 | 70.2 |
| | 28 | -4.461 | 0.02 | | |
| | *29 | 4.7226 | 1.00 | 1.59041 | 60.4 |
| | *30 | -8.3181 | D30( VA ) | | |
| 50 | 31 | -21.2018 | 0.52 | 1.93137 | 19.0 |
| | 32 | ∞ | 0.14 | | |
| P | 33 | ∞ | 4.67 | 1.51872 | 64.2 |
| | 34 | ∞ | 1.47 | | |

Si : SURFACE NUMBER    νdj : ABBE NUMBER
Ri : RADIUS OF CURVATURE    VA : VARIABLE
Di : SURFACE SPACING    AD : APERTURE DIAPHRAGM
Nej : REFRACTIVE INDEX    * : ASPHERICAL SURFACE

FIG. 20A

| AC | SURFACE NUMBER | |
|---|---|---|
| | EXAMPLE 5 : ASPHERICAL DATA | |
| | 10-TH SURFACE | |
| KA | 0.8997389 | |
| $RA_3$ | 7.2710814E−01 | |
| $RA_4$ | 7.0754259E+01 | |
| $RA_5$ | 4.2840549E+02 | |
| $RA_6$ | −5.7647495E+03 | |
| $RA_7$ | −5.1002844E+03 | |
| $RA_8$ | 1.0149264E+06 | |
| $RA_9$ | −2.3351690E+07 | |
| $RA_{10}$ | 1.5015419E+08 | |
| | 29-TH SURFACE | 30-TH SURFACE |
| KA | 1.2721988 | 0.7882985 |
| $RA_4$ | −2.5286505E+01 | 1.5310380E+01 |
| $RA_6$ | −8.7038338E+02 | −1.0985598E+03 |
| $RA_8$ | −2.7744017E+04 | 4.3434696E+04 |
| $RA_{10}$ | 2.4082678E+06 | |

AC : ASPHERICAL COEFFICIENT

FIG. 20B

| EXAMPLE 5 : DATA CONCERNING ZOOMING | | | | | | | |
|---|---|---|---|---|---|---|---|
| | f | FNo. | 2ω | D9 | D16 | D25 | D30 |
| WE | 1.00 | 1.86 | 77.2 | 0.32 | 8.12 | 1.81 | 0.29 |
| TE | 11.50 | 2.10 | 7.4 | 7.96 | 0.48 | 1.59 | 0.26 |

WE : WIDE ANGLE END
TE : TELEPHOTO END

FIG. 21

| EXAMPLE 6 : BASIC LENS DATA | | | | | |
|---|---|---|---|---|---|
| | Si | Ri | Di | Nej | νdj |
| 10 | 1 | 28.6039 | 0.40 | 1.85504 | 23.8 |
| | 2 | 10.6797 | 2.01 | 1.49846 | 81.5 |
| | 3 | ∞ | 0.03 | | |
| | 4 | 13.9930 | 0.93 | 1.77621 | 49.6 |
| | 5 | 40.7347 | 0.03 | | |
| | 6 | 8.0676 | 1.11 | 1.73234 | 54.7 |
| | 7 | 23.4677 | D7(VA) | | |
| 20 | *8 | 46.1884 | 0.27 | 1.80820 | 40.4 |
| | 9 | 1.6858 | 0.91 | | |
| | 10 | -3.5242 | 0.18 | 1.83946 | 42.7 |
| | 11 | 2.7498 | 0.81 | 1.93324 | 20.9 |
| | 12 | -24.9117 | 0.00 | | |
| | 13 | 5.7730 | 0.59 | 1.48914 | 70.4 |
| | 14 | -36.2592 | D14(VA) | | |
| | 15(AD) | ∞ | 0.50 | | |
| 30 | 16 | 15.5991 | 0.52 | 1.93432 | 18.9 |
| | 17 | -8.1466 | 0.29 | | |
| | 18 | -28.0278 | 0.79 | 1.49846 | 81.5 |
| | 19 | -2.7651 | 0.15 | 1.91048 | 31.3 |
| | 20 | -3.9621 | 0.29 | | |
| | 21 | -3.1720 | 0.23 | 2.00994 | 25.5 |
| | 22 | -116.9622 | D22(VA) | | |
| 40 | 23 | -14.4188 | 0.17 | 1.85504 | 23.8 |
| | 24 | 14.4188 | 0.75 | 1.48914 | 70.4 |
| | 25 | -3.9090 | 0.02 | | |
| | *26 | 3.8384 | 1.05 | 1.59041 | 60.4 |
| | *27 | -3.4065 | D27(VA) | | |
| 50 | 28 | -13.0155 | 0.23 | 1.88814 | 40.8 |
| | 29 | ∞ | 0.13 | | |
| P | 30 | ∞ | 4.35 | 1.51872 | 64.2 |
| | 31 | ∞ | 1.18 | | |

Si : SURFACE NUMBER
Ri : RADIUS OF CURVATURE
Di : SURFACE SPACING
Nej : REFRACTIVE INDEX
νdj : ABBE NUMBER
VA : VARIABLE
AD : APERTURE DIAPHRAGM
* : ASPHERICAL SURFACE

FIG. 22A

| AC | SURFACE NUMBER | |
|---|---|---|
| | EXAMPLE 6 : ASPHERICAL DATA | |
| | 8-TH SURFACE | |
| KA | 0.9009190 | |
| $RA_3$ | 1.5126460E+00 | |
| $RA_4$ | -2.9320402E+01 | |
| $RA_5$ | 3.3969065E+03 | |
| $RA_6$ | -6.8394757E+04 | |
| $RA_7$ | 1.6656023E+05 | |
| $RA_8$ | 8.1399215E+06 | |
| $RA_9$ | -7.6190479E+07 | |
| $RA_{10}$ | 1.4138706E+08 | |
| | 26-TH SURFACE | 27-TH SURFACE |
| KA | 1.2590665 | 0.8540455 |
| $RA_4$ | -5.9502029E+01 | 1.0869523E+02 |
| $RA_6$ | -2.4282088E+03 | -2.9368680E+03 |
| $RA_8$ | -1.4636191E+05 | 1.4370588E+05 |
| $RA_{10}$ | 8.6968047E+06 | |

AC : ASPHERICAL COEFFICIENT

FIG. 22B

| EXAMPLE 6 : DATA CONCERNING ZOOMING | | | | | | | |
|---|---|---|---|---|---|---|---|
| | f | FNo. | 2ω | D7 | D14 | D22 | D27 |
| WE | 1.00 | 1.86 | 73.0 | 0.27 | 7.29 | 1.25 | 0.26 |
| TE | 11.00 | 1.87 | 7.2 | 6.65 | 0.91 | 1.27 | 0.41 |

WE : WIDE ANGLE END
TE : TELEPHOTO END

FIG. 23

| EXAMPLE 7 : BASIC LENS DATA ||||||
|---|---|---|---|---|---|
| | Si | Ri | Di | Nej | νdj |
| 10 | 1 | 29.0079 | 0.40 | 1.85504 | 23.8 |
| | 2 | 10.7228 | 2.01 | 1.49846 | 81.5 |
| | 3 | ∞ | 0.03 | | |
| | 4 | 14.3792 | 0.93 | 1.77621 | 49.6 |
| | 5 | 43.1438 | 0.03 | | |
| | 6 | 7.9394 | 1.11 | 1.73234 | 54.7 |
| | 7 | 22.5213 | D7 ( VA ) | | |
| 20 | *8 | 33.0068 | 0.27 | 1.80820 | 40.4 |
| | 9 | 1.6595 | 0.91 | | |
| | 10 | -3.4076 | 0.18 | 1.83946 | 42.7 |
| | 11 | 2.7735 | 0.82 | 1.93324 | 20.9 |
| | 12 | -19.7126 | 0.00 | | |
| | 13 | 5.8361 | 0.59 | 1.48914 | 70.4 |
| | 14 | -37.3534 | D14 ( VA ) | | |
| | 15 ( AD ) | ∞ | 0.50 | | |
| 30 | 16 | 20.2461 | 0.52 | 1.93432 | 18.9 |
| | 17 | -7.8462 | 0.29 | | |
| | 18 | -22.5096 | 0.79 | 1.49846 | 81.5 |
| | 19 | -2.7661 | 0.15 | 1.91048 | 31.3 |
| | 20 | -3.9463 | 0.29 | | |
| | 21 | -3.2495 | 0.23 | 2.00994 | 25.5 |
| | 22 | -36.4871 | D22 ( VA ) | | |
| 40 | 23 | -14.7311 | 0.17 | 1.85504 | 23.8 |
| | 24 | 14.7311 | 0.75 | 1.48914 | 70.4 |
| | 25 | -3.9104 | 0.02 | | |
| | *26 | 3.9811 | 1.05 | 1.59041 | 60.4 |
| | *27 | -3.6671 | D27 ( VA ) | | |
| 50 | 28 | -15.2638 | 0.23 | 1.88814 | 40.8 |
| | 29 | ∞ | 0.13 | | |
| P | 30 | ∞ | 4.35 | 1.51872 | 64.2 |
| | 31 | ∞ | 1.18 | | |

Si : SURFACE NUMBER
Ri : RADIUS OF CURVATURE
Di : SURFACE SPACING
Nej : REFRACTIVE INDEX
νdj : ABBE NUMBER
VA : VARIABLE
AD : APERTURE DIAPHRAGM
* : ASPHERICAL SURFACE

FIG. 24A

| EXAMPLE 7 : ASPHERICAL DATA | | |
|---|---|---|
| AC | SURFACE NUMBER | |
| | 8-TH SURFACE | |
| KA | 0.9009169 | |
| $RA_3$ | 1.6131823E+00 | |
| $RA_4$ | -3.9566042E+01 | |
| $RA_5$ | 3.6764798E+03 | |
| $RA_6$ | -6.9062177E+04 | |
| $RA_7$ | 1.4297523E+05 | |
| $RA_8$ | 8.0395941E+06 | |
| $RA_9$ | -7.4973597E+07 | |
| $RA_{10}$ | 1.5342083E+08 | |
| | 26-TH SURFACE | 27-TH SURFACE |
| KA | 1.2434094 | 0.9019169 |
| $RA_4$ | -5.1316014E+01 | 9.2901676E+01 |
| $RA_6$ | -2.2682304E+03 | -3.1954355E+03 |
| $RA_8$ | -1.5497832E+05 | 1.4772031E+05 |
| $RA_{10}$ | 8.5407048E+06 | |

AC : ASPHERICAL COEFFICIENT

FIG. 24B

| EXAMPLE 7 : DATA CONCERNING ZOOMING | | | | | | | |
|---|---|---|---|---|---|---|---|
| | f | FNo. | 2ω | D7 | D14 | D22 | D27 |
| WE | 1.00 | 1.86 | 73.0 | 0.27 | 7.41 | 1.21 | 0.26 |
| TE | 13.00 | 1.86 | 6.2 | 6.92 | 0.76 | 1.25 | 0.22 |

WE : WIDE ANGLE END
TE : TELEPHOTO END

FIG. 25

| | EXAMPLE 8 : BASIC LENS DATA | | | | |
|---|---|---|---|---|---|
| | Si | Ri | Di | Nej | νdj |
| 10 | 1 | 73.3462 | 0.43 | 1.88814 | 40.8 |
| | 2 | 8.3558 | 2.91 | | |
| | 3 | 10.7910 | 2.19 | 1.49846 | 81.5 |
| | 4 | -23.2073 | 0.03 | | |
| | 5 | 13.9696 | 0.43 | 1.88730 | 39.8 |
| | 6 | 6.5558 | 1.94 | 1.49846 | 81.5 |
| | 7 | ∞ | 0.03 | | |
| | 8 | 11.2669 | 1.31 | 1.75844 | 52.3 |
| | 9 | -44.8673 | D9( VA ) | | |
| 20 | *10 | -31.6059 | 0.31 | 1.80820 | 40.4 |
| | 11 | 1.8936 | 0.32 | | |
| | 12 | 2.3221 | 0.55 | 1.48915 | 70.2 |
| | 13 | 17.1641 | 0.38 | | |
| | 14 | -3.9452 | 0.20 | 1.91571 | 33.9 |
| | 15 | 2.8417 | 1.31 | 1.93432 | 18.9 |
| | 16 | -11.5255 | D16( VA ) | | |
| | 17( AD ) | ∞ | 0.63 | | |
| 30 | 18 | -3.9404 | 0.23 | 1.49846 | 81.5 |
| | 19 | 4.7865 | 1.02 | 1.86499 | 23.9 |
| | 20 | -6.1530 | 0.20 | | |
| | 21 | 4.5419 | 1.05 | 1.49846 | 81.5 |
| | 22 | -3.9247 | 0.18 | 2.00994 | 25.5 |
| | 23 | -7.4771 | 0.26 | | |
| | 24 | -5.6537 | 0.25 | 1.92413 | 19.4 |
| | 25 | 9.0610 | D25( VA ) | | |
| 40 | 26 | -107.7545 | 0.26 | 1.93137 | 19.0 |
| | 27 | 107.7545 | 0.86 | 1.48915 | 70.2 |
| | 28 | -4.4631 | 0.02 | | |
| | *29 | 4.7121 | 1.00 | 1.59041 | 60.4 |
| | *30 | -8.3398 | D30( VA ) | | |
| 50 | 31 | -21.1229 | 0.52 | 1.93137 | 19.0 |
| | 32 | ∞ | 0.14 | | |
| P | 33 | ∞ | 4.67 | 1.51872 | 64.2 |
| | 34 | ∞ | 1.50 | | |

Si : SURFACE NUMBER  
Ri : RADIUS OF CURVATURE  
Di : SURFACE SPACING  
Nej : REFRACTIVE INDEX  
νdj : ABBE NUMBER  
VA : VARIABLE  
AD : APERTURE DIAPHRAGM  
* : ASPHERICAL SURFACE

FIG. 26A

| EXAMPLE 8 : ASPHERICAL DATA | | |
|---|---|---|
| AC | SURFACE NUMBER | |
| | 10-TH SURFACE | |
| KA | 0.8997382 | |
| $RA_3$ | 7.3594217E-01 | |
| $RA_4$ | 7.1828412E+01 | |
| $RA_5$ | 4.1894449E+02 | |
| $RA_6$ | -5.7873969E+03 | |
| $RA_7$ | -4.7469566E+03 | |
| $RA_8$ | 1.0163620E+06 | |
| $RA_9$ | -2.3254000E+07 | |
| $RA_{10}$ | 1.4912888E+08 | |
| | 29-TH SURFACE | 30-TH SURFACE |
| KA | 1.2721988 | 0.7882985 |
| $RA_4$ | -2.5250757E+01 | 1.5288736E+01 |
| $RA_6$ | -8.6833355E+02 | -1.0959726E+03 |
| $RA_8$ | -2.7652585E+04 | 4.3291554E+04 |
| $RA_{10}$ | 2.3980684E+06 | |

AC : ASPHERICAL COEFFICIENT

FIG. 26B

| EXAMPLE 8 : DATA CONCERNING ZOOMING | | | | | | | |
|---|---|---|---|---|---|---|---|
| | f | FNo. | $2\omega$ | D9 | D16 | D25 | D30 |
| WE | 1.00 | 1.86 | 77.2 | 0.33 | 8.12 | 1.56 | 0.29 |
| TE | 11.00 | 2.02 | 7.8 | 7.90 | 0.54 | 1.49 | 0.37 |

WE : WIDE ANGLE END
TE : TELEPHOTO END

FIG. 27

| | EXAMPLE 9 : BASIC LENS DATA | | | | |
|---|---|---|---|---|---|
| | Si | Ri | Di | Nej | νdj |
| 10 { | 1 | 75.7444 | 0.43 | 1.88814 | 40.8 |
| | 2 | 8.3557 | 2.92 | | |
| | 3 | 10.9201 | 2.20 | 1.49846 | 81.5 |
| | 4 | -22.1117 | 0.03 | | |
| | 5 | 13.7052 | 0.43 | 1.89085 | 39.4 |
| | 6 | 6.5478 | 1.93 | 1.49846 | 81.5 |
| | 7 | ∞ | 0.03 | | |
| | 8 | 11.3440 | 1.31 | 1.75844 | 52.3 |
| | 9 | -44.5825 | D9 ( VA ) | | |
| 20 { | *10 | -29.5066 | 0.31 | 1.80820 | 40.4 |
| | 11 | 1.8900 | 0.31 | | |
| | 12 | 2.3086 | 0.55 | 1.48915 | 70.2 |
| | 13 | 17.0620 | 0.38 | | |
| | 14 | -3.9155 | 0.20 | 1.91266 | 34.0 |
| | 15 | 2.8422 | 1.31 | 1.93432 | 18.9 |
| | 16 | -11.4913 | D16 ( VA ) | | |
| | 17 ( AD ) | ∞ | 0.63 | | |
| 30 { | 18 | -3.9271 | 0.23 | 1.49846 | 81.5 |
| | 19 | 4.7682 | 0.99 | 1.86593 | 24.1 |
| | 20 | -6.1489 | 0.19 | | |
| | 21 | 4.5596 | 1.05 | 1.49846 | 81.5 |
| | 22 | -3.9006 | 0.18 | 2.00994 | 25.5 |
| | 23 | -7.5816 | 0.26 | | |
| | 24 | -5.6450 | 0.25 | 1.91998 | 19.7 |
| | 25 | 9.0207 | D25 ( VA ) | | |
| 40 { | 26 | -79.4486 | 0.25 | 1.93112 | 19.0 |
| | 27 | 79.4486 | 0.86 | 1.48915 | 70.2 |
| | 28 | -4.4577 | 0.02 | | |
| | *29 | 4.7809 | 1.00 | 1.59041 | 60.4 |
| | *30 | -8.0509 | D30 ( VA ) | | |
| 50 { | 31 | -23.7517 | 0.52 | 1.93136 | 19.0 |
| | 32 | ∞ | 0.14 | | |
| P { | 33 | ∞ | 4.66 | 1.51872 | 64.2 |
| | 34 | ∞ | 1.55 | | |

Si : SURFACE NUMBER  νdj : ABBE NUMBER
Ri : RADIUS OF CURVATURE  VA : VARIABLE
Di : SURFACE SPACING  AD : APERTURE DIAPHRAGM
Nej : REFRACTIVE INDEX  * : ASPHERICAL SURFACE

FIG. 28A

| EXAMPLE 9 : ASPHERICAL DATA | | |
|---|---|---|
| AC | SURFACE NUMBER | |
| | 10-TH SURFACE | |
| KA | 0.8997377 | |
| $RA_3$ | 9.0132510E-01 | |
| $RA_4$ | 7.2383809E+01 | |
| $RA_5$ | 3.7185337E+02 | |
| $RA_6$ | -5.9319794E+03 | |
| $RA_7$ | -2.2929418E+03 | |
| $RA_8$ | 1.0561087E+06 | |
| $RA_9$ | -2.3418065E+07 | |
| $RA_{10}$ | 1.4796017E+08 | |
| | 29-TH SURFACE | 30-TH SURFACE |
| KA | 1.2721988 | 0.7882985 |
| $RA_4$ | -2.5343862E+01 | 1.5345109E+01 |
| $RA_6$ | -8.7367633E+02 | -1.1027160E+03 |
| $RA_8$ | -2.7891079E+04 | 4.3664929E+04 |
| $RA_{10}$ | 2.4246929E+06 | |

AC : ASPHERICAL COEFFICIENT

FIG. 28B

| EXAMPLE 9 : DATA CONCERNING ZOOMING | | | | | | | |
|---|---|---|---|---|---|---|---|
| | f | FNo. | 2ω | D9 | D16 | D25 | D30 |
| WE | 1.00 | 1.86 | 77.2 | 0.32 | 8.12 | 1.55 | 0.29 |
| TE | 13.00 | 2.39 | 6.4 | 8.11 | 0.32 | 1.90 | 0.06 |

WE : WIDE ANGLE END
TE : TELEPHOTO END

FIG. 29

| | EXAMPLE 10 : BASIC LENS DATA | | | | |
|---|---|---|---|---|---|
| | Si | Ri | Di | Nej | νdj |
| 10 { | 1 | 27.6992 | 0.40 | 1.85504 | 23.8 |
| | 2 | 10.6706 | 2.01 | 1.49846 | 81.5 |
| | 3 | ∞ | 0.03 | | |
| | 4 | 14.0747 | 0.93 | 1.77621 | 49.6 |
| | 5 | 38.1630 | 0.03 | | |
| | 6 | 8.2042 | 1.11 | 1.73234 | 54.7 |
| | 7 | 24.2250 | D7( VA ) | | |
| 20 { | *8 | 40.2365 | 0.27 | 1.80820 | 40.4 |
| | 9 | 1.7058 | 0.91 | | |
| | 10 | -3.4692 | 0.18 | 1.83946 | 42.7 |
| | 11 | 2.8154 | 0.76 | 1.93324 | 20.9 |
| | 12 | -20.6032 | 0.00 | | |
| | 13 | 6.1154 | 0.59 | 1.48914 | 70.4 |
| | 14 | -51.0349 | D14( VA ) | | |
| | 15( AD ) | ∞ | 0.50 | | |
| 30 { | 16 | 19.7794 | 0.52 | 1.93432 | 18.9 |
| | 17 | -7.6401 | 0.29 | | |
| | 18 | -25.3052 | 0.79 | 1.49846 | 81.5 |
| | 19 | -2.7639 | 0.15 | 1.91048 | 31.3 |
| | 20 | -4.0185 | 0.29 | | |
| | 21 | -3.2496 | 0.23 | 2.00994 | 25.5 |
| | 22 | -30.9988 | D22( VA ) | | |
| 40 { | 23 | -13.9253 | 0.17 | 1.85504 | 23.8 |
| | 24 | 13.9253 | 0.75 | 1.48914 | 70.4 |
| | 25 | -3.9073 | 0.02 | | |
| | *26 | 4.0450 | 1.05 | 1.59041 | 60.4 |
| | *27 | -3.6460 | D27( VA ) | | |
| 50 { | 28 | -15.4298 | 0.23 | 1.88814 | 40.8 |
| | 29 | ∞ | 0.13 | | |
| P { | 30 | ∞ | 4.35 | 1.51872 | 64.2 |
| | 31 | ∞ | 1.18 | | |

Si : SURFACE NUMBER  νdj : ABBE NUMBER
Ri : RADIUS OF CURVATURE  VA : VARIABLE
Di : SURFACE SPACING  AD : APERTURE DIAPHRAGM
Nej : REFRACTIVE INDEX  * : ASPHERICAL SURFACE

FIG. 30A

| EXAMPLE 10 : ASPHERICAL DATA | | |
|---|---|---|
| AC | SURFACE NUMBER | |
| | 8-TH SURFACE | |
| KA | 0.9009238 | |
| $RA_3$ | 1.1491312E+00 | |
| $RA_4$ | -2.9475367E+01 | |
| $RA_5$ | 3.6047339E+03 | |
| $RA_6$ | -7.0137217E+04 | |
| $RA_7$ | 1.4892751E+05 | |
| $RA_8$ | 8.2138404E+06 | |
| $RA_9$ | -7.4978440E+07 | |
| $RA_{10}$ | 1.3797506E+08 | |
| | 26-TH SURFACE | 27-TH SURFACE |
| KA | 1.2430108 | 0.893006 |
| $RA_4$ | -4.7466043E+01 | 9.6050160E+01 |
| $RA_6$ | -2.1719804E+03 | -3.3552308E+03 |
| $RA_8$ | -1.5959240E+05 | 1.5144969E+05 |
| $RA_{10}$ | 8.5360578E+06 | |

AC : ASPHERICAL COEFFICIENT

FIG. 30B

| EXAMPLE 9 : DATA CONCERNING ZOOMING | | | | | | | |
|---|---|---|---|---|---|---|---|
| | f | FNo. | 2ω | D7 | D14 | D22 | D27 |
| WE | 1.00 | 1.86 | 73.2 | 0.27 | 7.33 | 1.34 | 0.26 |
| TE | 14.00 | 1.86 | 5.6 | 7.06 | 0.54 | 1.41 | 0.19 |

WE : WIDE ANGLE END
TE : TELEPHOTO END

FIG. 31

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| |f3|/BF | 8.97 | 6.83 | 44.24 | 81.27 | 85.19 | 9.81 | 13.43 | 77.59 | 48.83 | 33.01 |
| Ft/Fw | 11.50 | 11.50 | 11.50 | 11.50 | 11.50 | 11.00 | 13.00 | 11.00 | 13.00 | 14.00 |
| tanω | 0.70 | 0.65 | 0.70 | 0.80 | 0.75 | 0.70 | 0.70 | 0.75 | 0.75 | 0.70 |
| f31/fw | 5.91 | 6.02 | 5.57 | 11.10 | 10.10 | 5.79 | 6.11 | 10.20 | 10.10 | 5.96 |
| f32/fw | 15.00 | 14.70 | 18.10 | 10.90 | 8.80 | 15.00 | 15.70 | 8.80 | 9.00 | 16.20 |

VALUE CONCERNING CONDITIONAL EXPRESSION

EXAMPLE 1 (WIDE ANGLE END)

EXAMPLE 1 (TELEPHOTO END)

EXAMPLE 2 (WIDE ANGLE END)

EXAMPLE 2 (TELEPHOTO END)

EXAMPLE 3 (WIDE ANGLE END)

EXAMPLE 3 (TELEPHOTO END)

EXAMPLE 4 (WIDE ANGLE END)

EXAMPLE 4 (TELEPHOTO END)

EXAMPLE 5 (WIDE ANGLE END)

EXAMPLE 5 (TELEPHOTO END)

EXAMPLE 6 (WIDE ANGLE END)

EXAMPLE 6 (TELEPHOTO END)

EXAMPLE 7 (WIDE ANGLE END)

EXAMPLE 7 (TELEPHOTO END)

EXAMPLE 8 (WIDE ANGLE END)

EXAMPLE 8 (TELEPHOTO END)

EXAMPLE 9 (WIDE ANGLE END)

EXAMPLE 9 (TELEPHOTO END)

EXAMPLE 10 (WIDE ANGLE END)

EXAMPLE 10 (TELEPHOTO END)

ZOOM LENS AND IMAGING APPARATUS

This application is based on and claims priority under 35 U.S.C §119 from Japanese Patent Application No. 2008-062416, filed on Mar. 12, 2008, the entire disclosure of which is herein incorporated by reference.

BACKGROUND OF THE INVENTION

1. Field of the Invention

The present invention relates to a zoom lens and an imaging apparatus having a compact size and a high magnifying power which is used in a video camera for public use, a video camera for surveillance, and so on.

2. Description of Related Art

Recently, in a field of a zoom lens which is used in a video camera or the like, a video camera of a compact size has become more keenly requested. Generally, in the video camera for public use, a zoom lens of a rear focus type having a four group system in which four groups of lenses are arranged in power arrangement in order of positive, negative, positive and positive from an object side has been a main stream. In this zoom lens having the four lens groups, variation of power is performed mainly by moving a second lens group in a direction of an optical axis, while a first lens group and a third lens group are fixed, and correction of an image plane and focusing following this power variation are performed by a fourth lens.

In the zoom lens of the four group system as described above, it is requested that the zoom lens has a high magnifying power and a wide angle of view, when it is used in the video camera for surveillance. Moreover, it is also required to secure a sufficient back focal length for arranging a prism, for example, in order to cope with the video camera in a three CCD (Charge Coupled Device) system. Under the circumstances, there have been proposed in JP-A-06-337353, JP-A-2004-279726, JP-A-2006-047771, and JP-A-2007-171248, for example, zoom lenses of a four group structure having a power arrangement in order of positive, negative, positive and positive, in which a high magnifying power and a wide angle of view are realized, while a long back focal length is secured.

However, in any of the structures as disclosed in the above described Patent JP-A-06-337353, JP-A-2004-279726, and JP-A-2006-047771, the largest angle of view is about 60° or less, and a further larger angle of view (about 70°, for example) is required. In this case, there is such a problem that when the wide angle of view is realized, it becomes difficult to secure the long back focal length, and it becomes also difficult to obtain the high magnifying power, because fluctuation of aberration is increased.

On the other hand, in JP-A-2007-171248, the long back focal length can be realized, even with the wide angle of view of more than 70°. In JP-A-2007-171248, the third lens group is positive.

SUMMARY OF THE INVENTION

An object of an illustrative, non-limiting embodiment of the invention is to provide a zoom lens in which a wide angle of view and high variable power ratio can be realized, while a long back focal length is secured.

According to an aspect of the invention, there is provided a zoom lens including: a first group having a positive refractive power, a second group having a negative refractive power, a stop, a third group having a negative refractive power, and a fourth group having a positive refractive power in order from an object side. Power variation from the wide angle end to the telephoto end is performed by moving the second group to the image side along the optical axis, while the first group and the third group are fixed, and correction of an image plane following the power variation and focusing are performed by moving the fourth group along the optical axis. The third group includes at least two positive lenses and at least two negative lenses.

In the zoom lens, the power variation is performed by moving the second group along the optical axis, while the first group and the third group are fixed, and the correction of the resulted image plane is performed by the fourth group. On this occasion, because the third group has a negative power, a long back focal length can be secured. Moreover, because the third group includes at least two positive lenses and at least two negative lenses, a power to be burdened on each of the lenses is reduced, and fluctuation of aberration caused by realizing the wide angle and the high variable power is depressed.

Moreover, it would be preferable that the third group includes a thirty-first group having a positive refractive power and including at least one positive lens, a thirty-two group including a cemented lens of a positive lens and a negative lens, and a thirty-third group including at least one negative lens, in order from the object side. In this manner, chromatic aberration is favorably corrected, while the power to be burdened on one positive lens is reduced.

Further, it would be preferable that the fourth group includes at least two positive lenses, and at least one surface of these positive lenses is formed as an aspheric surface. In this manner, spherical aberration is favorably corrected in the entire range of the variable power.

Still further, it would be preferable that the following conditional expressions are satisfied. In this manner, various aberrations are favorably corrected in the entire range of the variable power, while the appropriate back focal length is secured. In these conditional expressions, f3 is a focal length of the third group, BF is a back focal length of the zoom lens, Fw is a focal length of the entire system at the wide-angle end, Ft is a focal length of the entire system at the telephoto end, and ω is a largest half angle of view of the entire system.

$$|f3|/BF>6.5 \tag{1}$$

$$10 \leq Ft/Fw \leq 15 \tag{2}$$

$$0.6 < \tan \omega < 0.85 \tag{3}$$

Still further, it would be preferable that the following conditional expressions are satisfied. In this manner, the various aberrations are favorably corrected. In these conditional expressions, f31 is a focal length of the thirty-first group in the third group, and f32 is a focal length of the thirty-second group in the third group.

$$5.0 < f31/Fw < 12.0 \tag{4}$$

$$8.0 < f32/Fw < 20.0 \tag{5}$$

Still further, it would be preferable that a fifth group including at least one negative lens and having a negative refractive power which is fixed during the power variation is provided at the image side of the fourth group. In this manner, the chromatic aberration can be advantageously corrected, and dust is prevented from entering into a lens barrel.

An imaging apparatus according to an aspect of the invention is provided with the zoom lens in this invention, and an imaging device for outputting an imaging signal corresponding to an optical image which has been formed by this zoom lens.

BRIEF DESCRIPTION OF THE DRAWINGS

The features of the invention will appear more fully upon consideration of the exemplary embodiment of the invention, which are schematically set forth in the drawings, in which:

FIGS. 1A and 1B are sectional views showing a first structural example (Example 1) of a zoom lens in an embodiment according to the invention, in which FIG. 1A shows positions of lenses at a wide angle end, and FIG. 1B shows positions of the lenses at a telephoto end;

FIGS. 2A and 2B are sectional views showing a second structural example (Example 2) of the zoom lens in the embodiment according to the invention, in which FIG. 2A shows positions of the lenses at the wide angle end, and FIG. 2B shows positions of the lenses at the telephoto end;

FIGS. 3A and 3B are sectional views showing a third structural example (Example 3) of the zoom lens in the embodiment according to the invention, in which FIG. 3A shows positions of the lenses at the wide angle end, and FIG. 3B shows positions of the lenses at the telephoto end;

FIGS. 4A and 4B are sectional views showing a fourth structural example (Example 4) of the zoom lens in the embodiment according to the invention, in which FIG. 4A shows positions of the lenses at the wide angle end, and FIG. 4B shows positions of the lenses at the telephoto end;

FIGS. 5A and 5B are sectional views showing a fifth structural example (Example 5) of the zoom lens in the embodiment according to the invention, in which FIG. 5A shows positions of the lenses at the wide angle end, and FIG. 5B shows positions of the lenses at the telephoto end;

FIGS. 6A and 6B are sectional views showing a sixth structural example (Example 6) of the zoom lens in the embodiment according to the invention, in which FIG. 6A shows positions of the lenses at the wide angle end, and FIG. 6B shows positions of the lenses at the telephoto end;

FIGS. 7A and 7B are sectional views showing a seventh structural example (Example 7) of the zoom lens in the embodiment according to the invention, in which FIG. 7A shows positions of the lenses at the wide angle end, and FIG. 7B shows positions of the lenses at the telephoto end;

FIGS. 8A and 8B are sectional views showing an eighth structural example (Example 8) of the zoom lens in the embodiment according to the invention, in which FIG. 8A shows positions of the lenses at the wide angle end, and FIG. 8B shows positions of the lenses at the telephoto end;

FIGS. 9A and 9B are sectional views showing a ninth structural example (Example 9) of the zoom lens in the embodiment according to the invention, in which FIG. 9A shows positions of the lenses at the wide angle end, and FIG. 9B shows positions of the lenses at the telephoto end;

FIGS. 10A and 10B are sectional views showing a tenth structural example (Example 10) of the zoom lens in the embodiment according to the invention, in which FIG. 10A shows positions of the lenses at the wide angle end, and FIG. 10B shows positions of the lenses at the telephoto end;

FIG. 11 is a chart showing basic lens data of the zoom lens in Example 1;

FIGS. 12A and 12B are charts showing other lens data of the zoom lens in Example 1, in which FIG. 12A shows the data concerning aspheric surfaces, and FIG. 12B shows the data concerning zooming;

FIG. 13 is a chart showing basic lens data of the zoom lens in Example 2;

FIGS. 14A and 14B are charts showing other lens data of the zoom lens in Example 2, in which FIG. 14A shows the data concerning the aspheric surfaces, and FIG. 14B shows the data concerning zooming;

FIG. 15 is a chart showing basic lens data of the zoom lens in Example 3;

FIGS. 16A and 16B is charts showing other lens data of the zoom lens in Example 3, in which FIG. 16A shows the data concerning the aspheric surfaces, and FIG. 16B shows the data concerning zooming;

FIG. 17 is a chart showing basic lens data of the zoom lens in Example 4;

FIGS. 18A and 18B are charts showing other lens data of the zoom lens in Example 4, in which FIG. 18A shows the data concerning the aspheric surfaces, and FIG. 18B shows the data concerning zooming;

FIG. 19 is a chart showing basic lens data of the zoom lens in Example 5;

FIGS. 20A and 20B is charts showing other lens data of the zoom lens in Example 5, in which FIG. 20A shows the data concerning the aspheric surfaces, and FIG. 20B shows the data concerning zooming:

FIG. 21 is a chart showing basic lens data of the zoom lens in Example 6;

FIGS. 22A and 22B are charts showing other lens data of the zoom lens in Example 6, in which FIG. 22A shows the data concerning the aspheric surfaces, and FIG. 22B shows the data concerning zooming;

FIG. 23 is a chart showing basic lens data of the zoom lens in Example 7;

FIGS. 24A and 24B are charts showing other lens data of the zoom lens in Example 7, in which FIG. 24A shows the data concerning the aspheric surfaces, and FIG. 24B shows the data concerning zooming;

FIG. 25 is a chart showing basic lens data of the zoom lens in Example 8;

FIGS. 26A and 26B are charts showing other lens data of the zoom lens in Example 8, in which FIG. 26A shows the data concerning the aspheric surfaces, and FIG. 26B shows the data concerning zooming;

FIG. 27 is a chart showing basic lens data of the zoom lens in Example 9;

FIGS. 28A and 28B are charts showing other lens data of the zoom lens in Example 9, in which FIG. 28A shows the data concerning the aspheric surfaces, and FIG. 28B shows the data concerning zooming;

FIG. 29 is a chart showing basic lens data of the zoom lens in Example 10;

FIGS. 30A and 30B are charts showing other lens data of the zoom lens in Example 10, in which FIG. 30A shows the data concerning the aspheric surfaces, and FIG. 30B shows the data concerning zooming;

FIG. 31 is a chart showing values concerning conditional expressions in the respective examples together;

Figure 36:
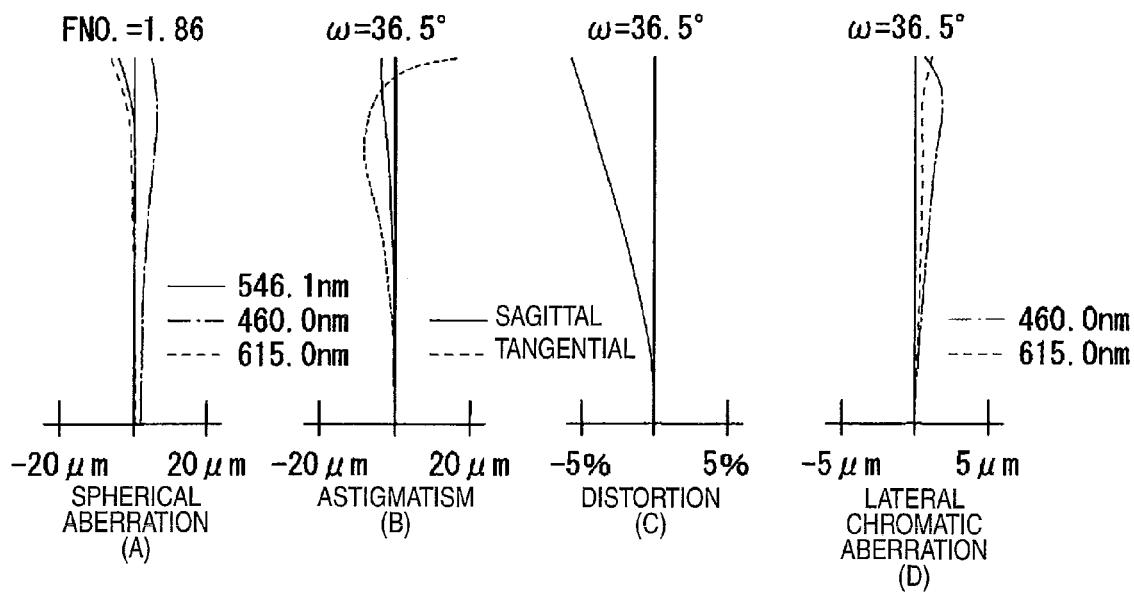
Figure 37:
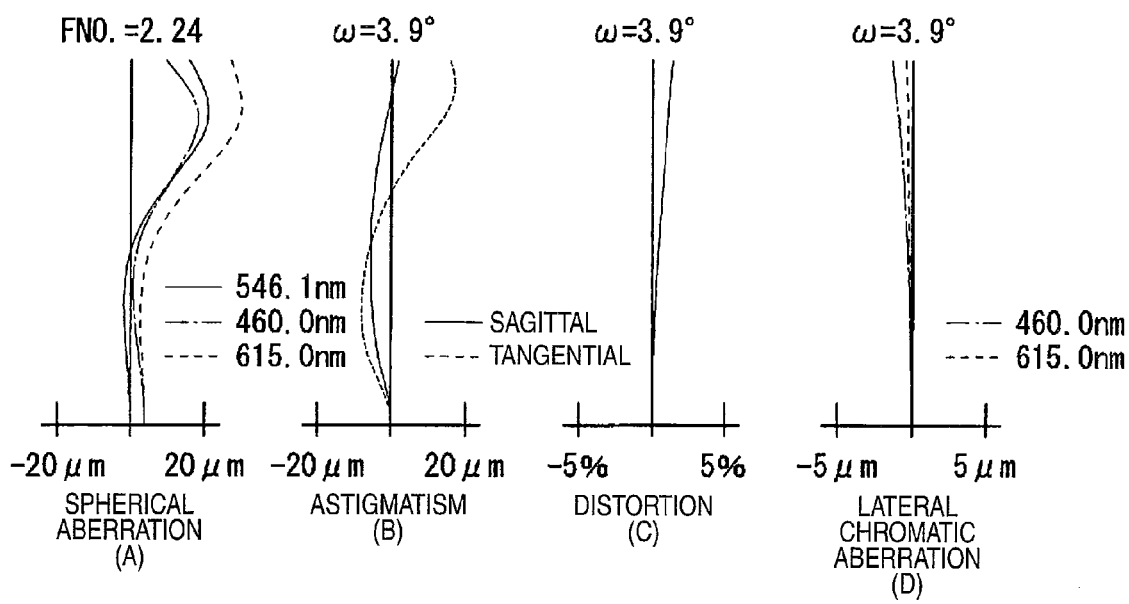
Figure 38:
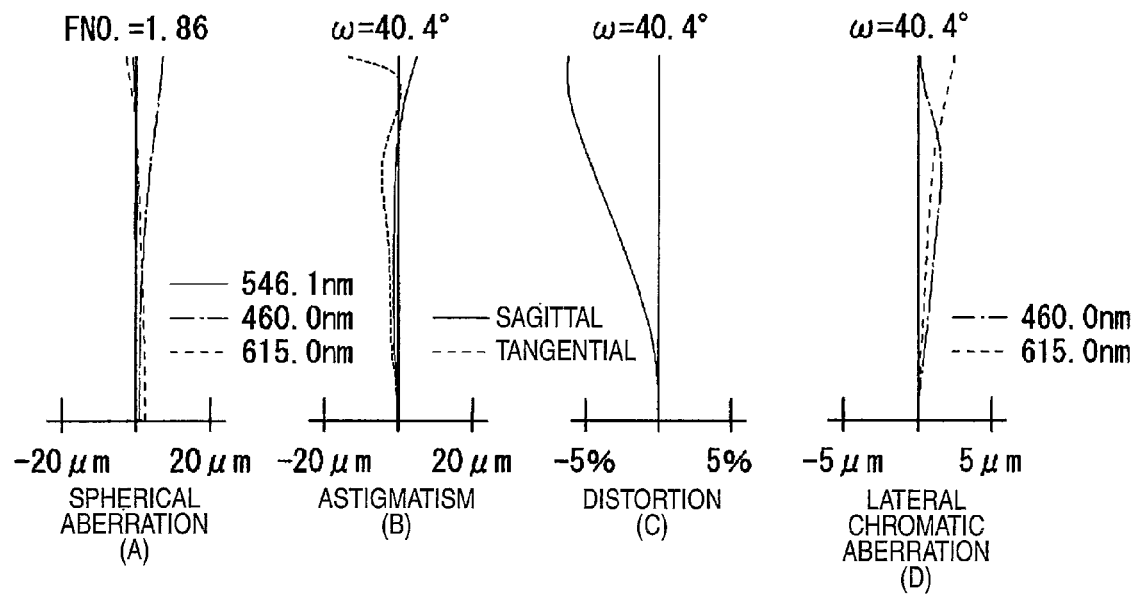
Figure 39:
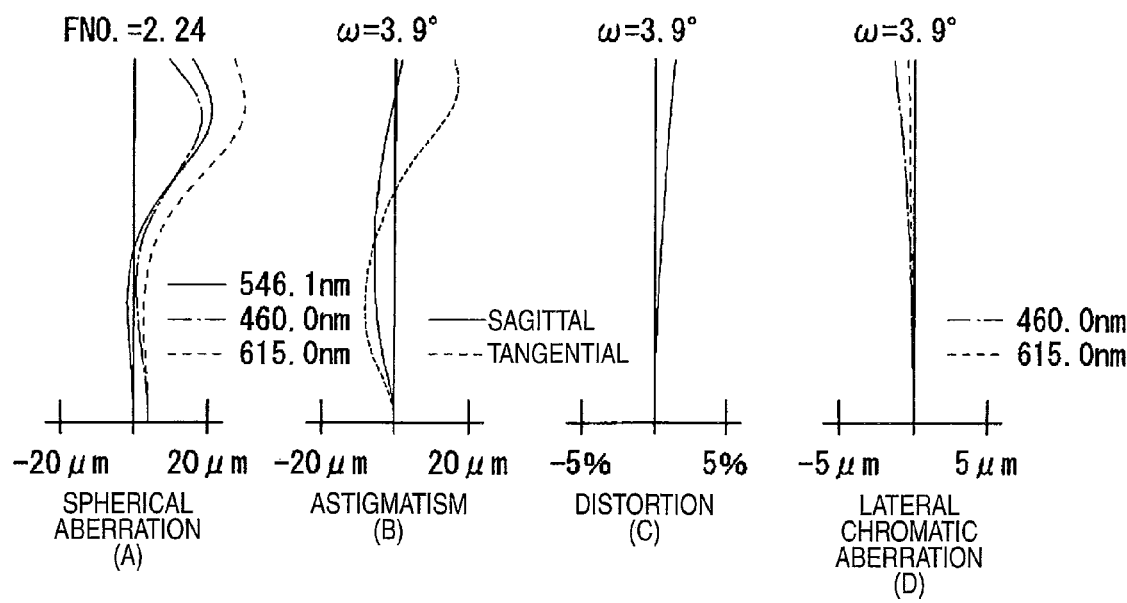
Figure 40:
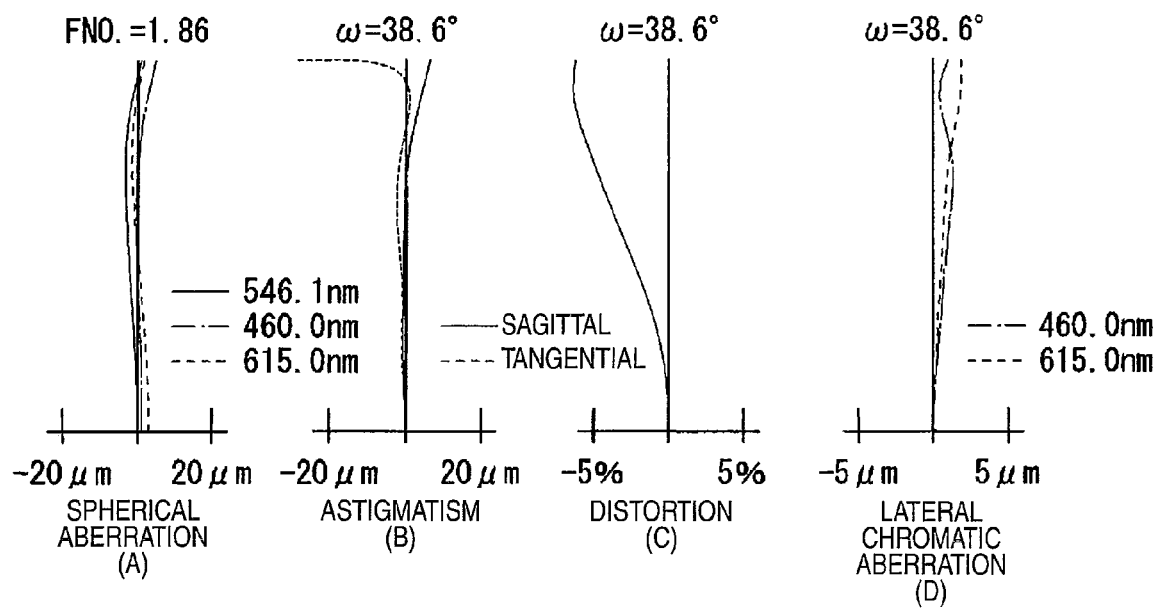
Figure 41:
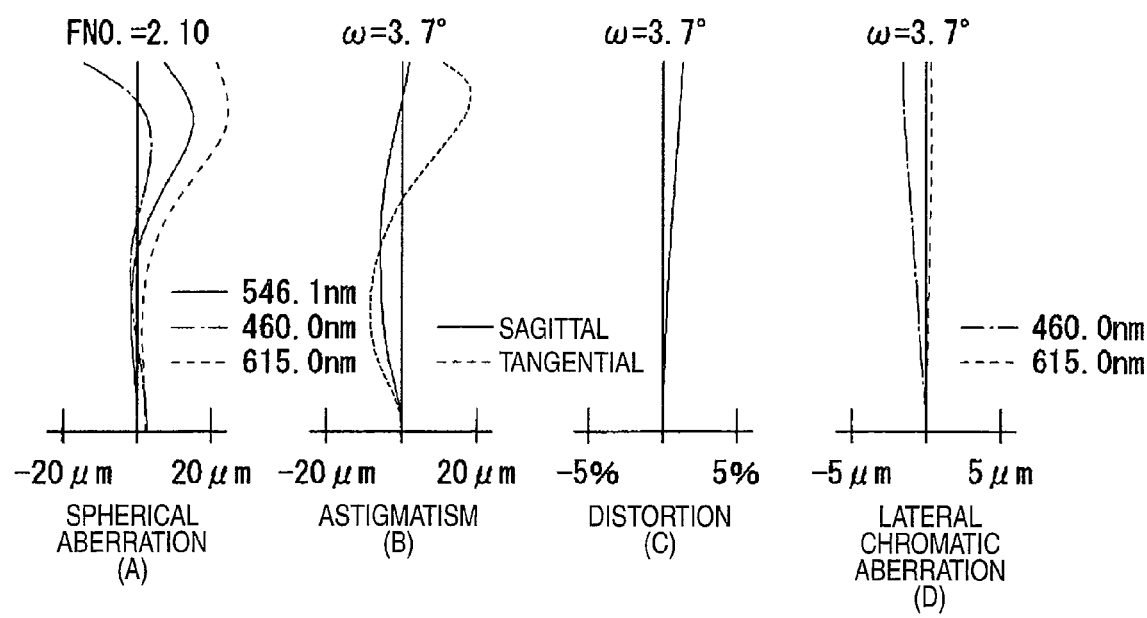
Figure 42:
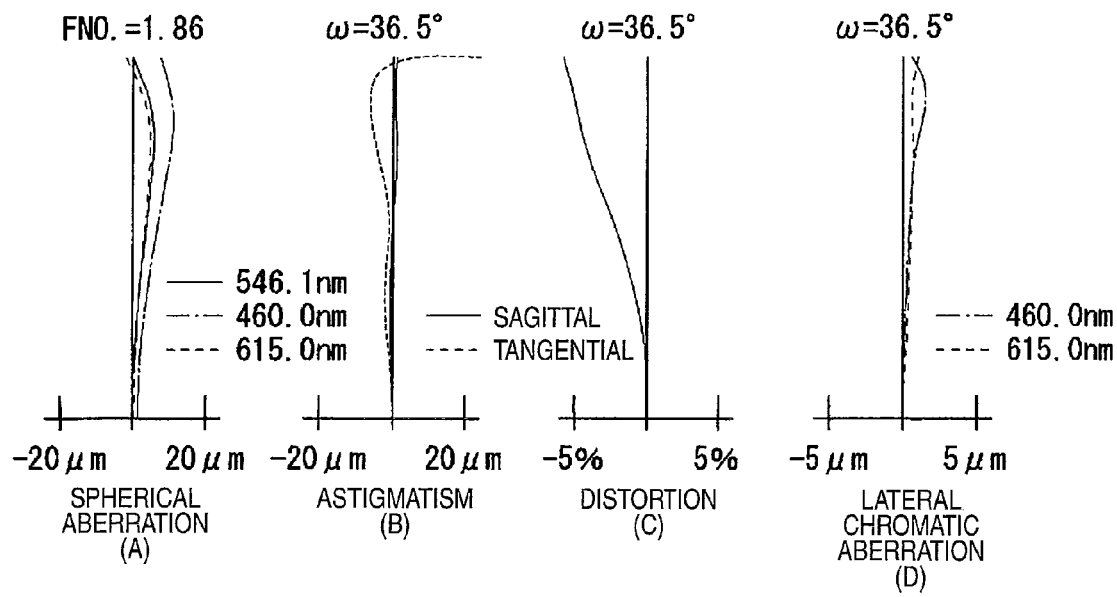
Figure 43:
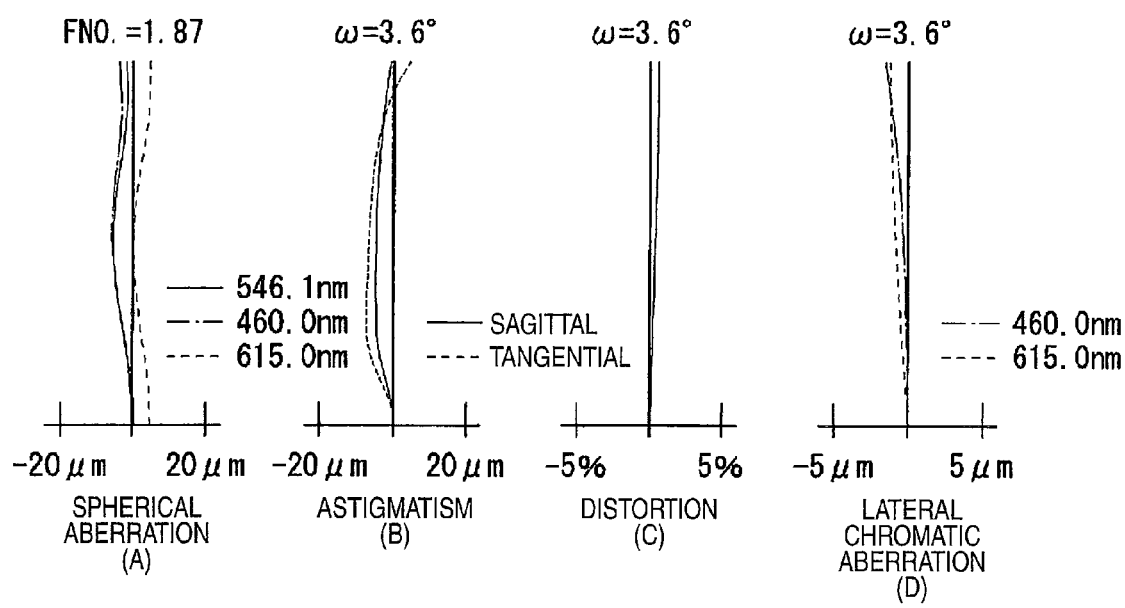
Figure 44:
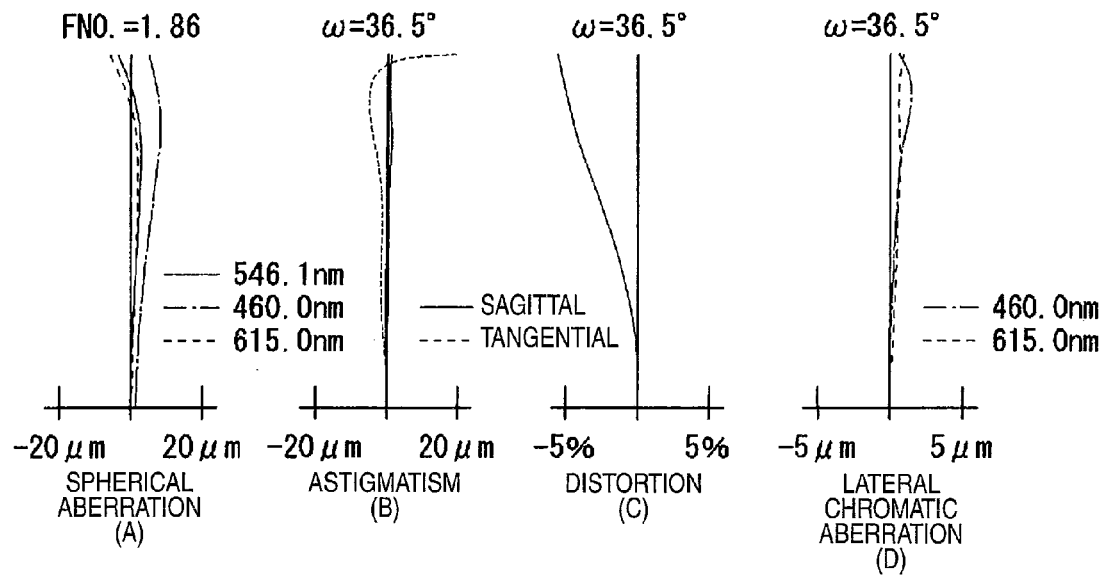
Figure 45:
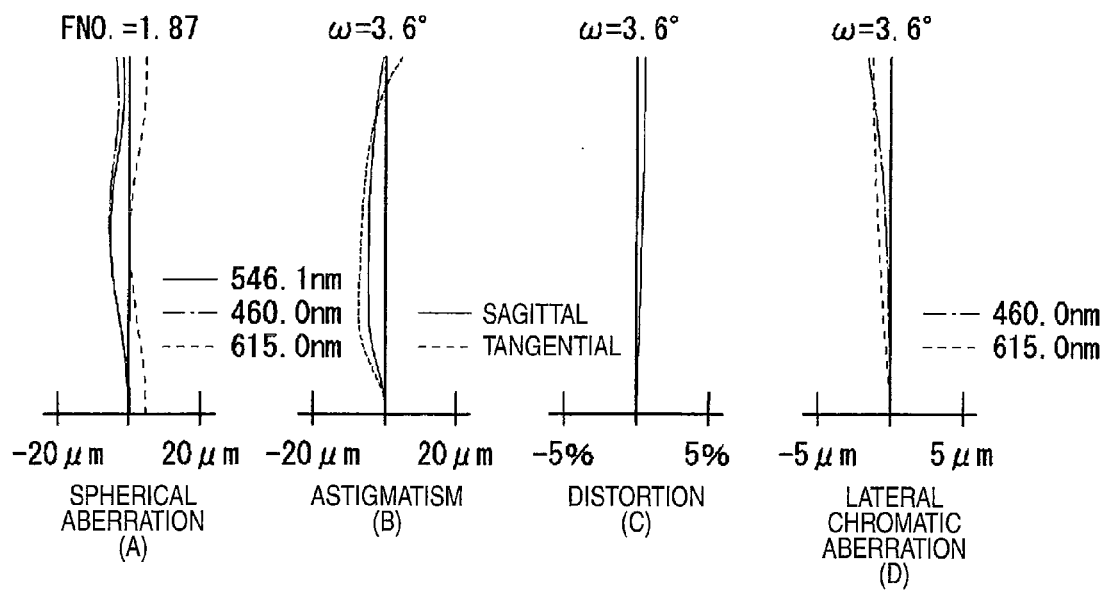
Figure 46:
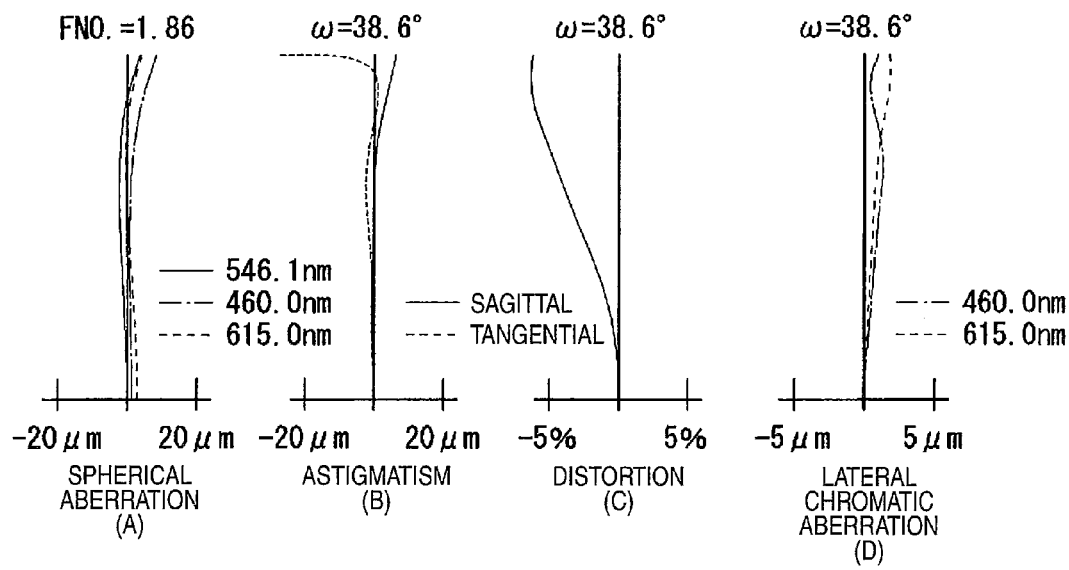
Figure 47:
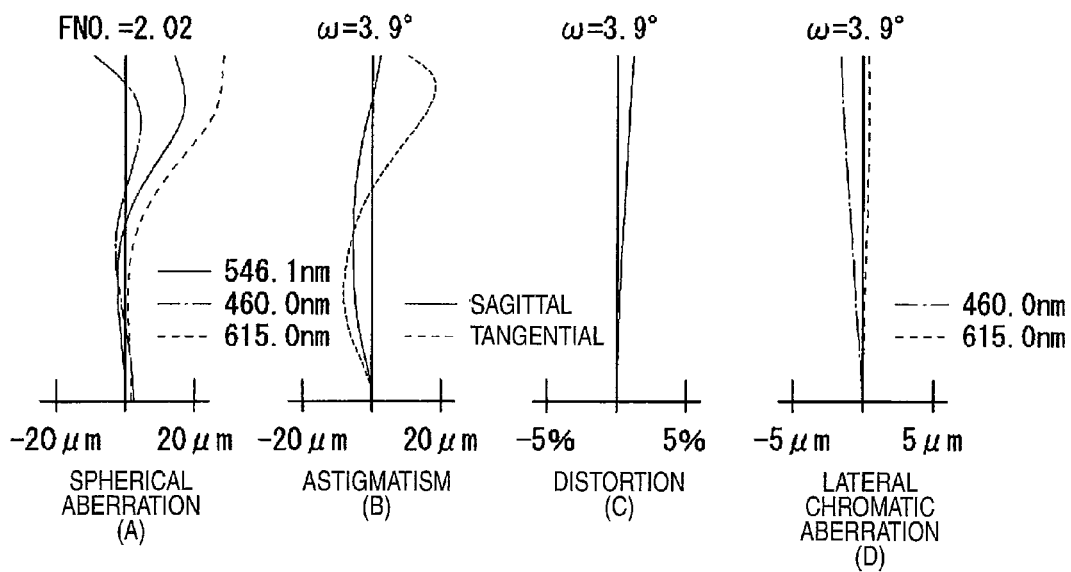
Figure 48:
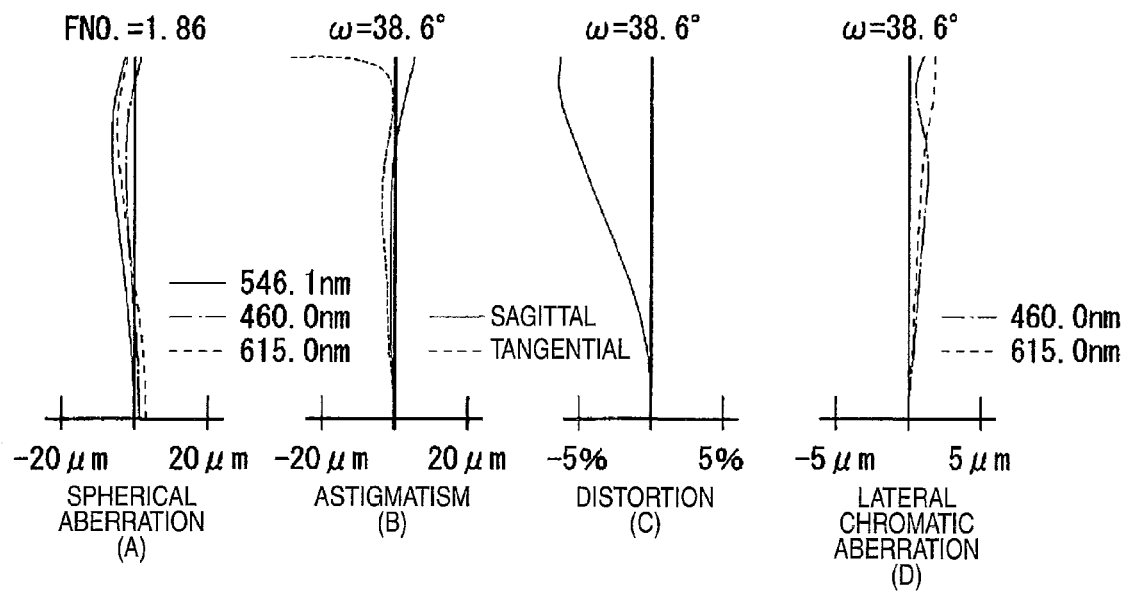
Figure 49:
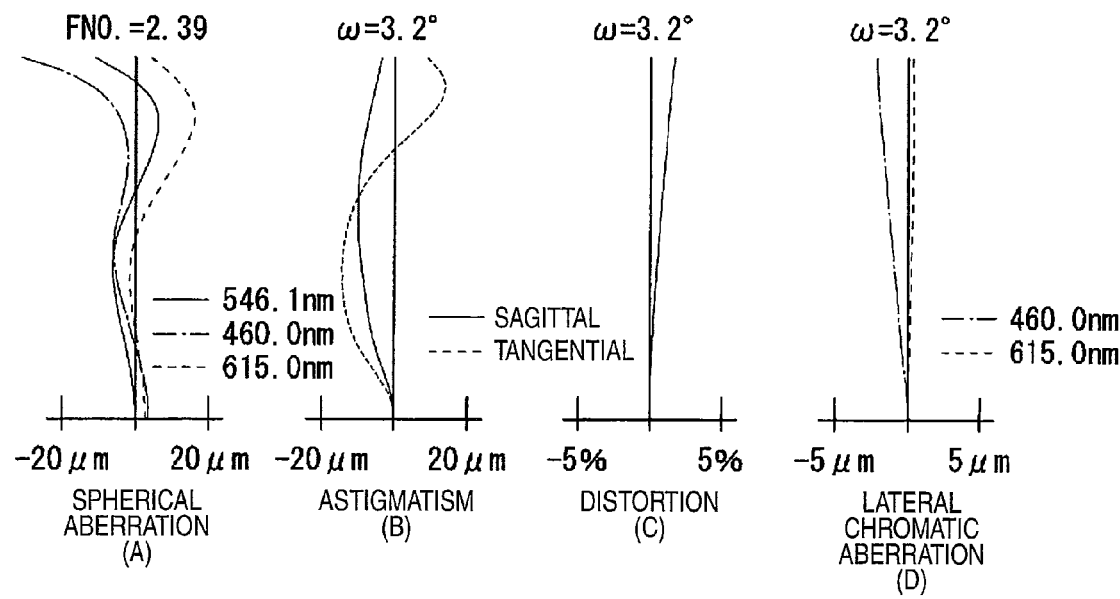
Figure 50:
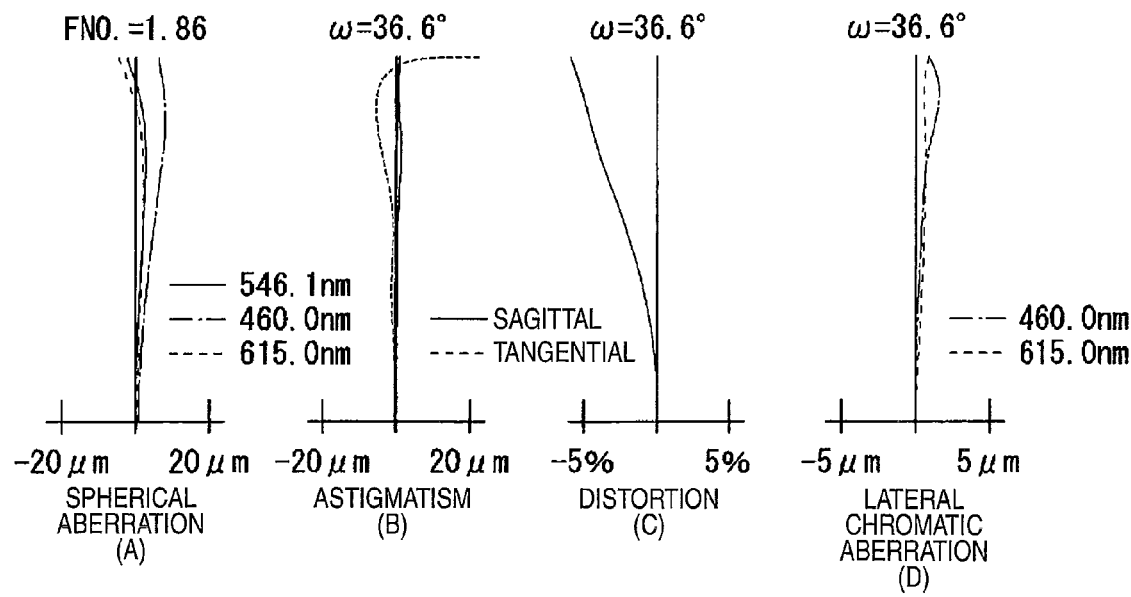
Figure 51:
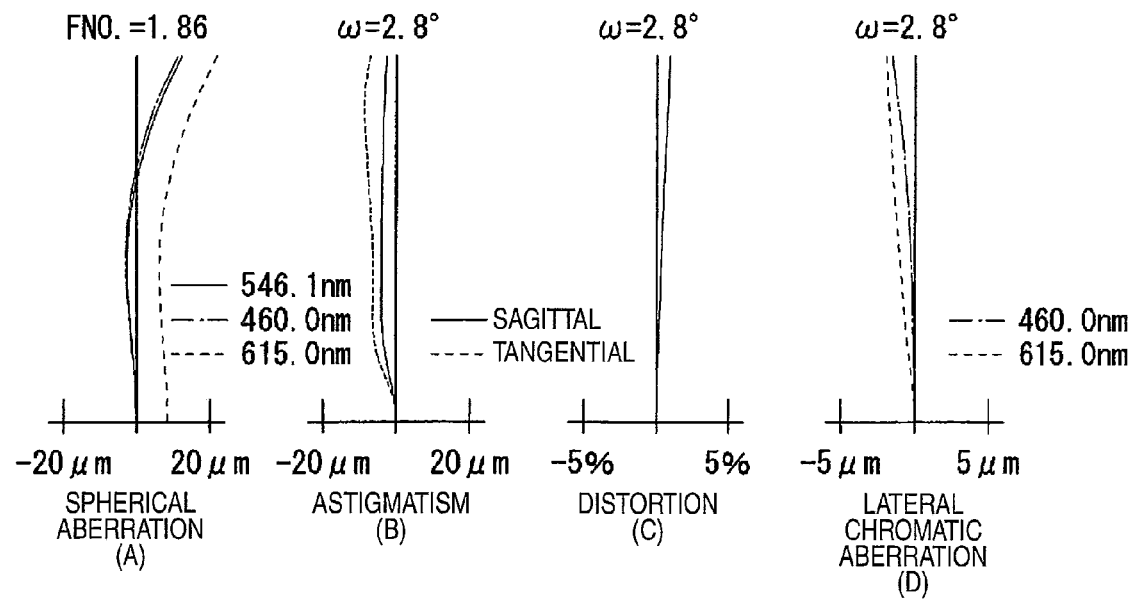
Figure 52:
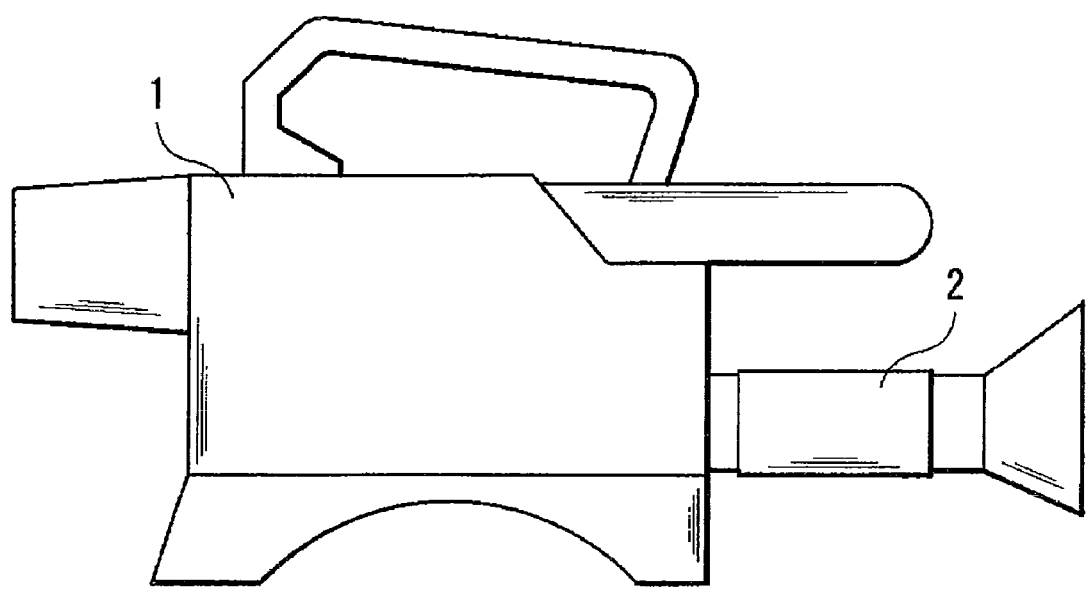

shows the spherical aberration, (B) shows the astigmatizm, (C) shows the distortion, and (D) shows the lateral chromatic aberration;

FIG. 36 is aberration diagrams showing the aberrations of the zoom lens in Example 3 at the wide angle end, in which (A) shows spherical aberration, (B) shows astigmatizm, (C) shows distortion, and (D) shows lateral chromatic aberration;

FIG. 37 is aberration diagrams showing the aberrations of the zoom lens in Example 3 at the telephoto end, in which (A) shows the spherical aberration, (B) shows the astigmatizm, (C) shows the distortion, and (D) shows the lateral chromatic aberration;

FIG. 38 is aberration diagrams showing the aberrations of the zoom lens in Example 4 at the wide angle end, in which (A) shows spherical aberration, (B) shows astigmatizm, (C) shows distortion, and (D) shows lateral chromatic aberration;

FIG. 39 is aberration diagrams showing the aberrations of the zoom lens in Example 4 at the telephoto end, in which (A) shows the spherical aberration, (B) shows the astigmatizm, (C) shows the distortion, and (D) shows the lateral chromatic aberration;

FIG. 40 is aberration diagrams showing the aberrations of the zoom lens in Example 5 at the wide angle end, in which (A) shows spherical aberration, (B) shows astigmatizm, (C) shows distortion, and (D) shows lateral chromatic aberration;

FIG. 41 is aberration diagrams showing the aberrations of the zoom lens in Example 5 at the telephoto end, in which (A) shows the spherical aberration, (B) shows the astigmatizm, (C) shows the distortion, and (D) shows the lateral chromatic aberration;

FIG. 42 is aberration diagrams showing the aberrations of the zoom lens in Example 6 at the wide angle end, in which (A) shows spherical aberration, (B) shows astigmatizm, (C) shows distortion, and (D) shows lateral chromatic aberration;

FIG. 43 is aberration diagrams showing the aberrations of the zoom lens in Example 6 at the telephoto end, in which (A) shows the spherical aberration, (B) shows the astigmatizm, (C) shows the distortion, and (D) shows the lateral chromatic aberration;

FIG. 44 is aberration diagrams showing the aberrations of the zoom lens in Example 7 at the wide angle end, in which (A) shows spherical aberration, (B) shows astigmatizm, (C) shows distortion, and (D) shows lateral chromatic aberration;

FIG. 45 is aberration diagrams showing the aberrations of the zoom lens in Example 7 at the telephoto end, in which (A) shows the spherical aberration, (B) shows the astigmatizm, (C) shows the distortion, and (D) shows the lateral chromatic aberration;

FIG. 46 is aberration diagrams showing the aberrations of the zoom lens in Example 8 at the wide angle end, in which (A) shows spherical aberration, (B) shows astigmatizm, (C) shows distortion, and (D) shows lateral chromatic aberration;

FIG. 47 is aberration diagrams showing the aberrations of the zoom lens in Example 8 at the telephoto end, in which (A) shows the spherical aberration, (B) shows the astigmatizm, (C) shows the distortion, and (D) shows the lateral chromatic aberration;

FIG. 48 is aberration diagrams showing the aberrations of the zoom lens in Example 9 at the wide angle end, in which (A) shows spherical aberration, (B) shows astigmatizm, (C) shows distortion, and (D) shows lateral chromatic aberration;

FIG. 49 is aberration diagrams showing the aberrations of the zoom lens in Example 9 at the telephoto end, in which (A) shows the spherical aberration, (B) shows the astigmatizm, (C) shows the distortion, and (D) shows the lateral chromatic aberration;

FIG. 50 is aberration diagrams showing the aberrations of the zoom lens in Example 10 at the wide angle end, in which (A) shows the spherical aberration, (B) shows the astigmatizm, (C) shows the distortion, and (D) shows the lateral chromatic aberration;

FIG. 51 is aberration diagrams showing the aberrations of the zoom lens in Example 10 at the telephoto end, in which (A) shows the spherical aberration, (B) shows the astigmatizm, (C) shows the distortion, and (D) shows the lateral chromatic aberration; and FIG. 52 is a view showing an example in which the wide angle zoom lens in the embodiment according to the invention is applied.

DETAILED DESCRIPTION OF THE EXEMPLARY EMBODIMENTS

According to a zoom lens in this invention, in the zoom lens of the four group system in which the power variation is performed by moving the second group along the optical axis, while the first group and the third group are the fixed groups, and the correction of the resulted image plane is performed by the fourth group, the third group includes at least two positive lenses and at least two negative lenses and has the negative refractive power. Therefore, it is possible to realize the wide angle of view and the high variable power, while the long back focal length is secured.

According to an imaging apparatus in this invention, the imaging signal corresponding to the optical image which has been formed by the zoom lens in this invention is outputted. Therefore, it is possible to obtain an image having a wide angle and high quality.

Now, exemplary embodiments of the invention will be described in detail referring to the drawings.

Figure 1A:
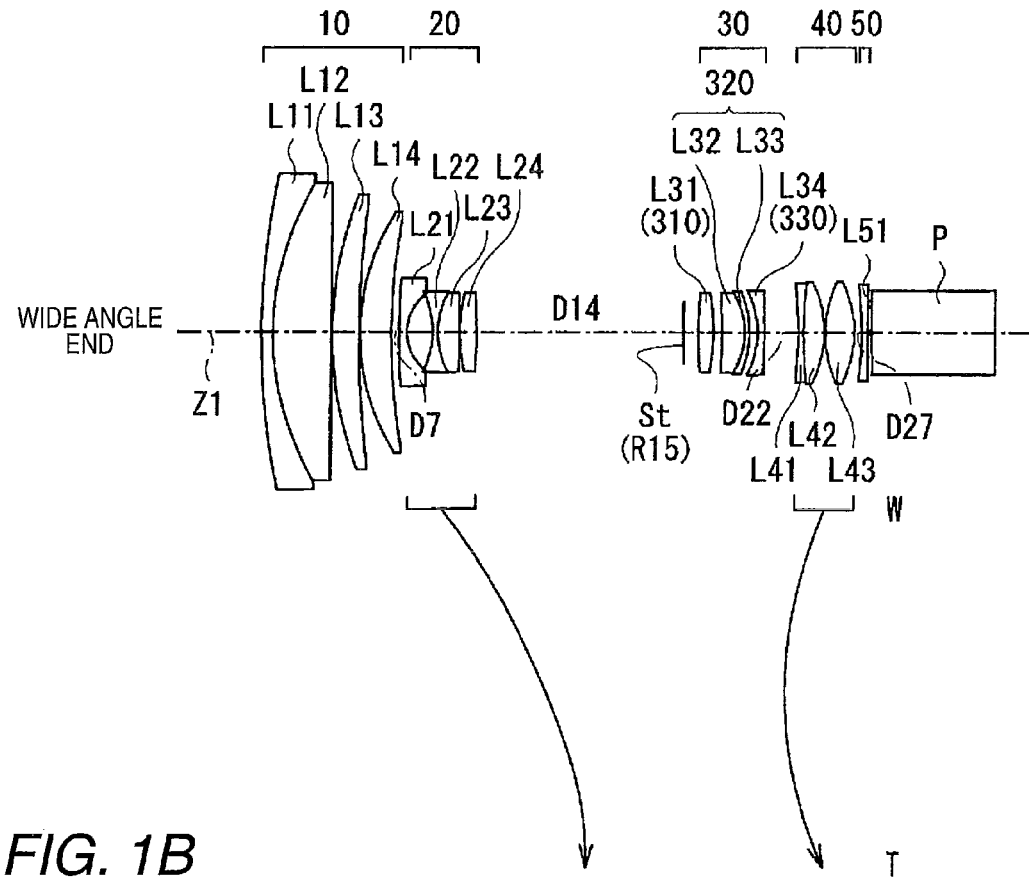
Figure 1B:
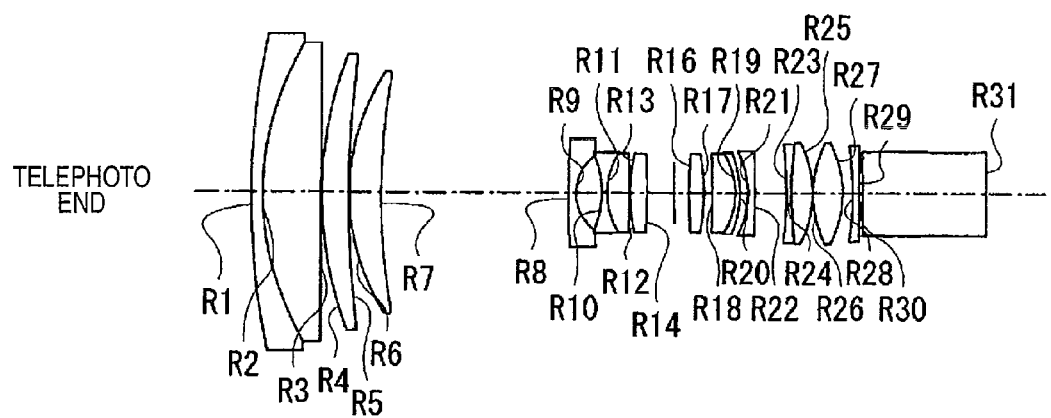
Figure 2A:
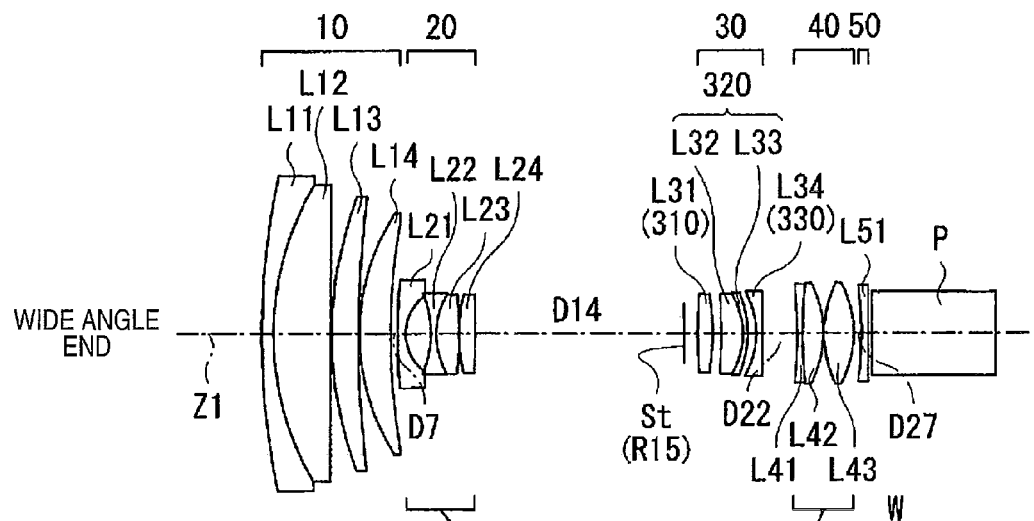
Figure 2B:
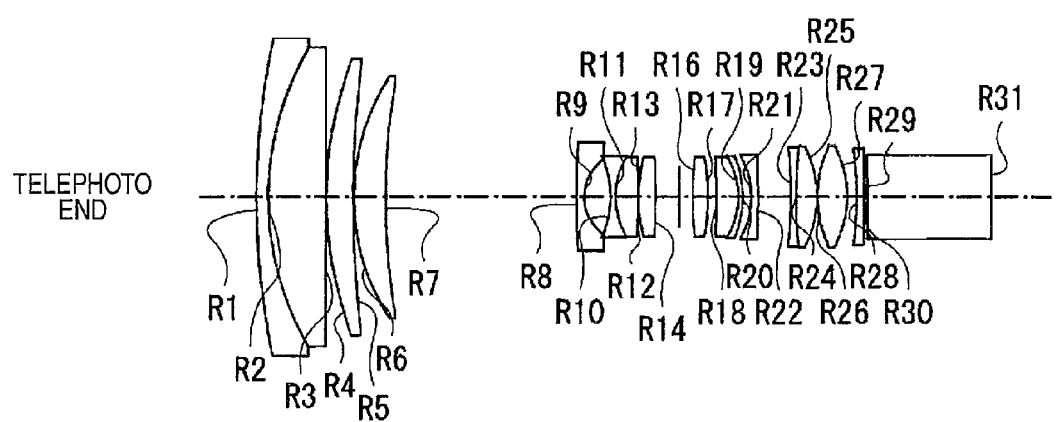
Figure 3A:
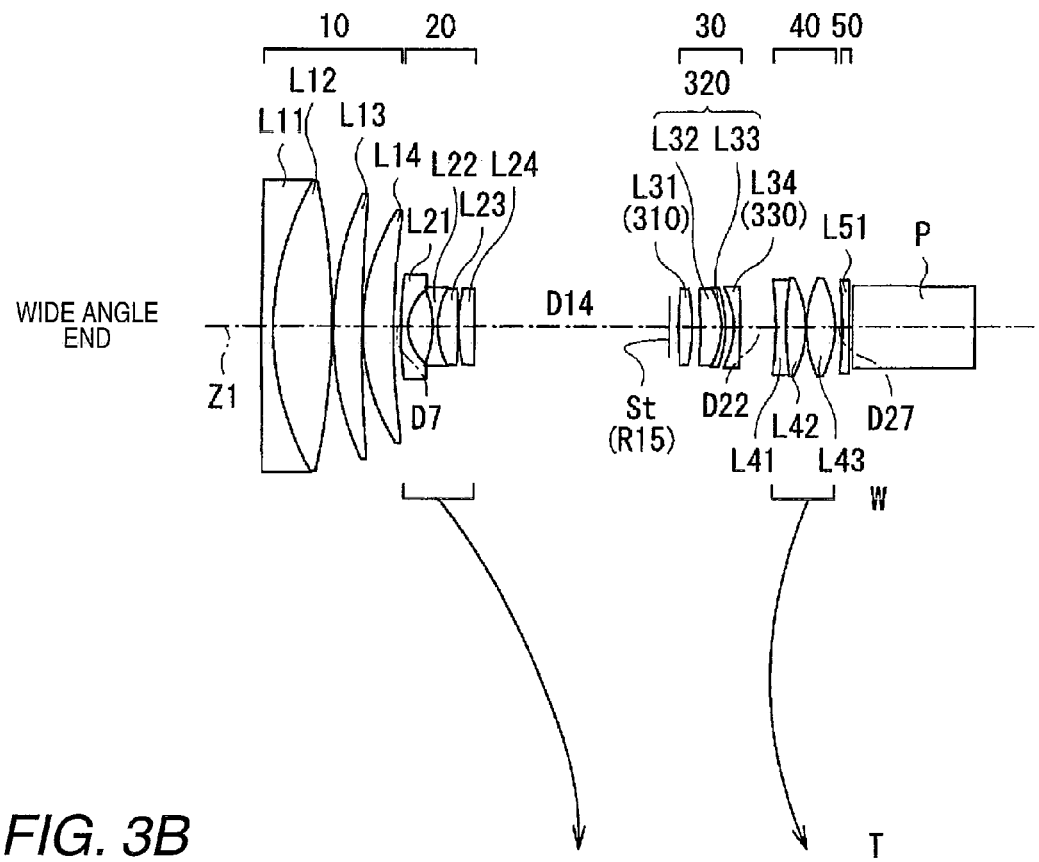
Figure 3B:
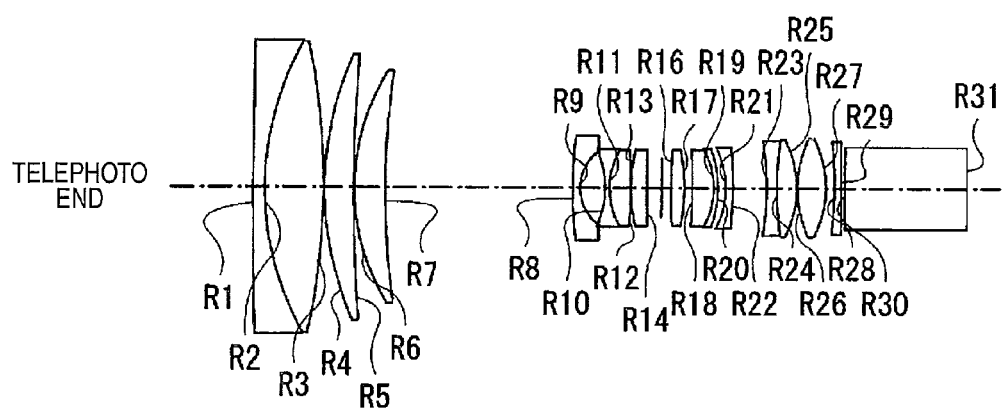
Figure 4A:
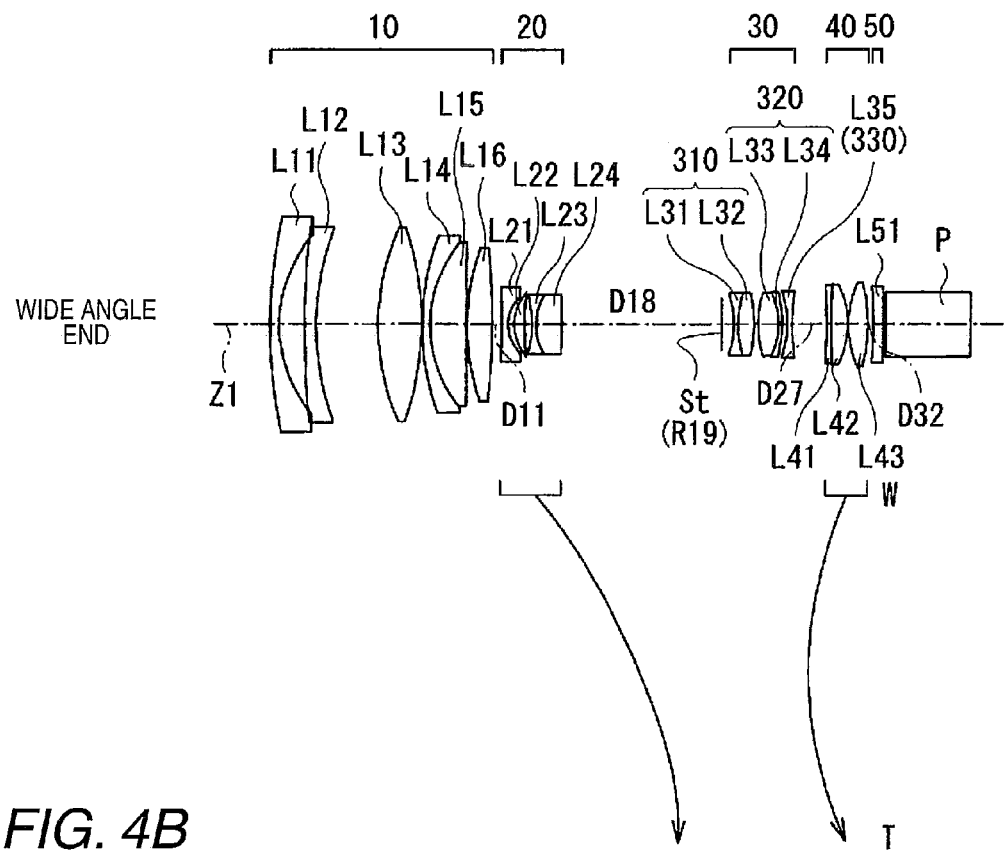
Figure 4B:
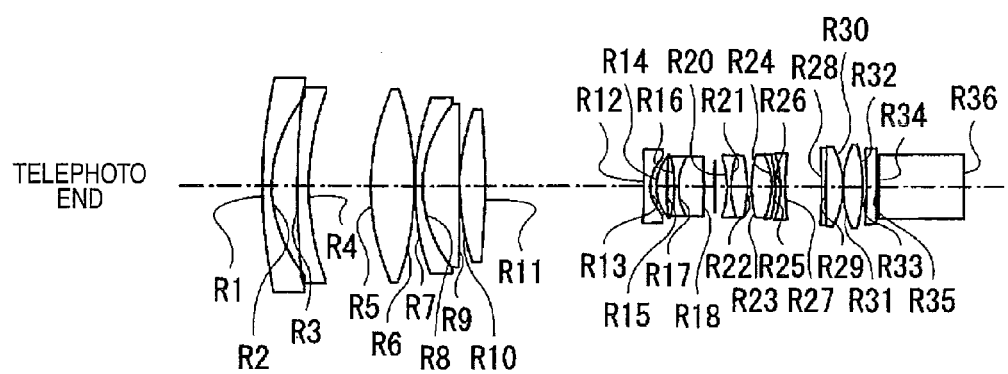
Figure 5A:
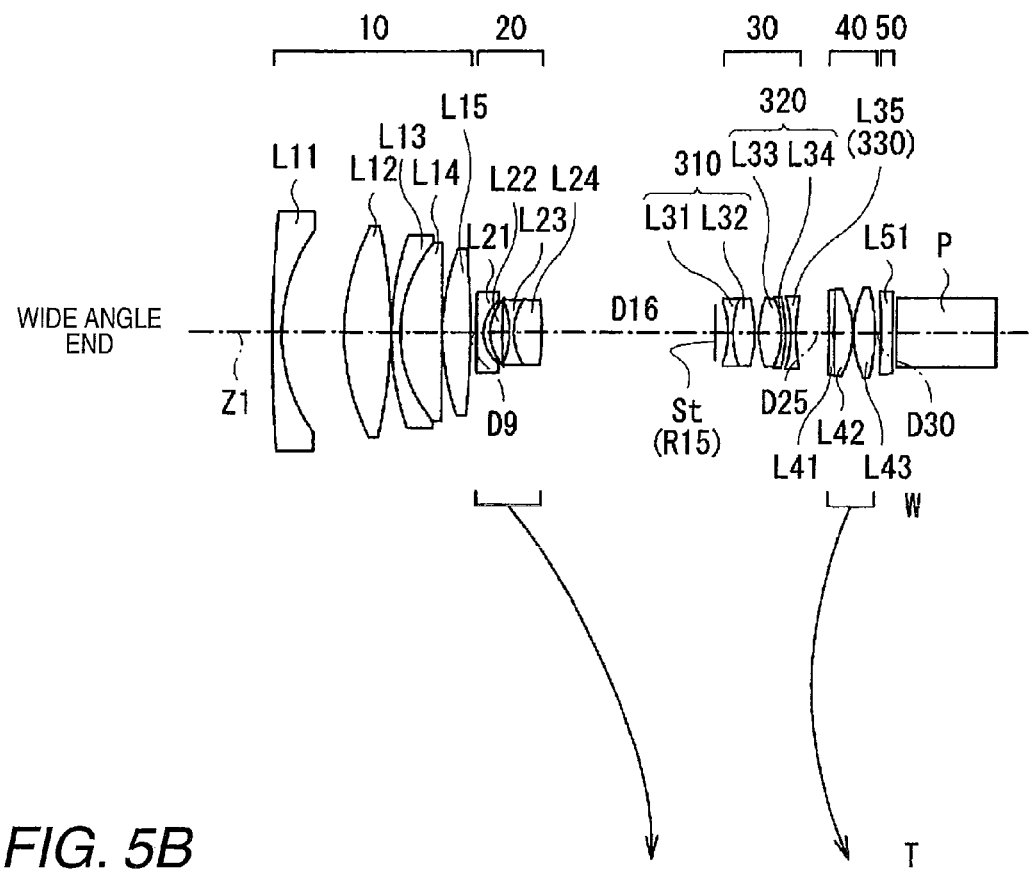
Figure 5B:
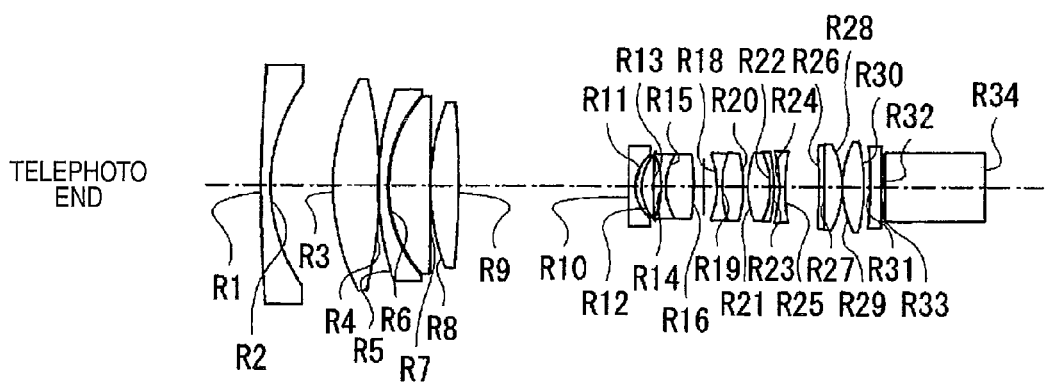
Figure 6A:
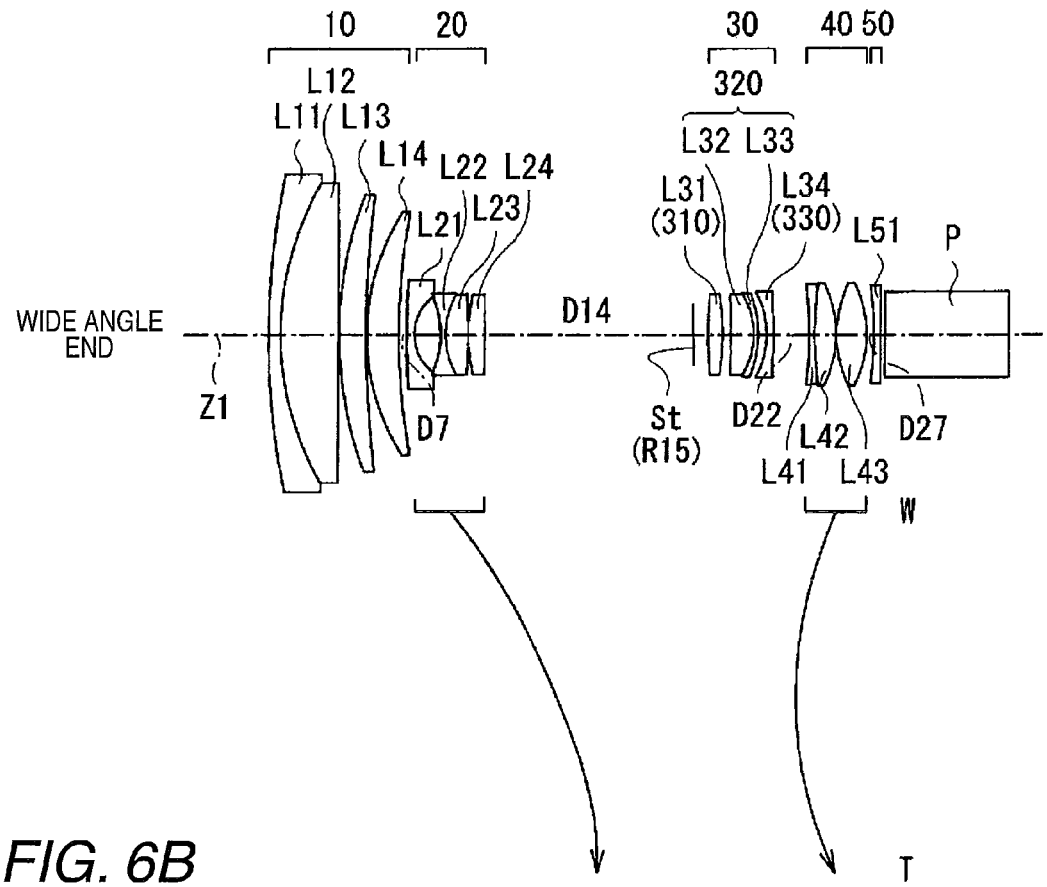
Figure 6B:
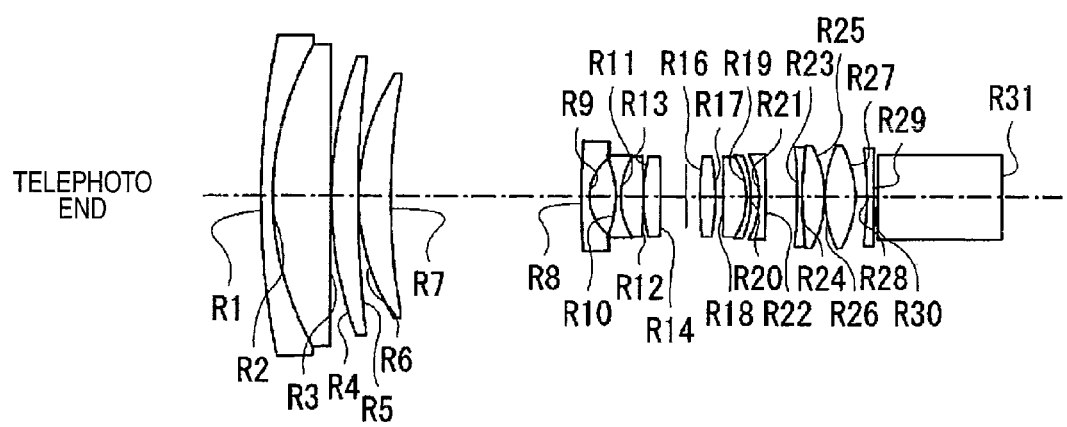
Figure 7A:
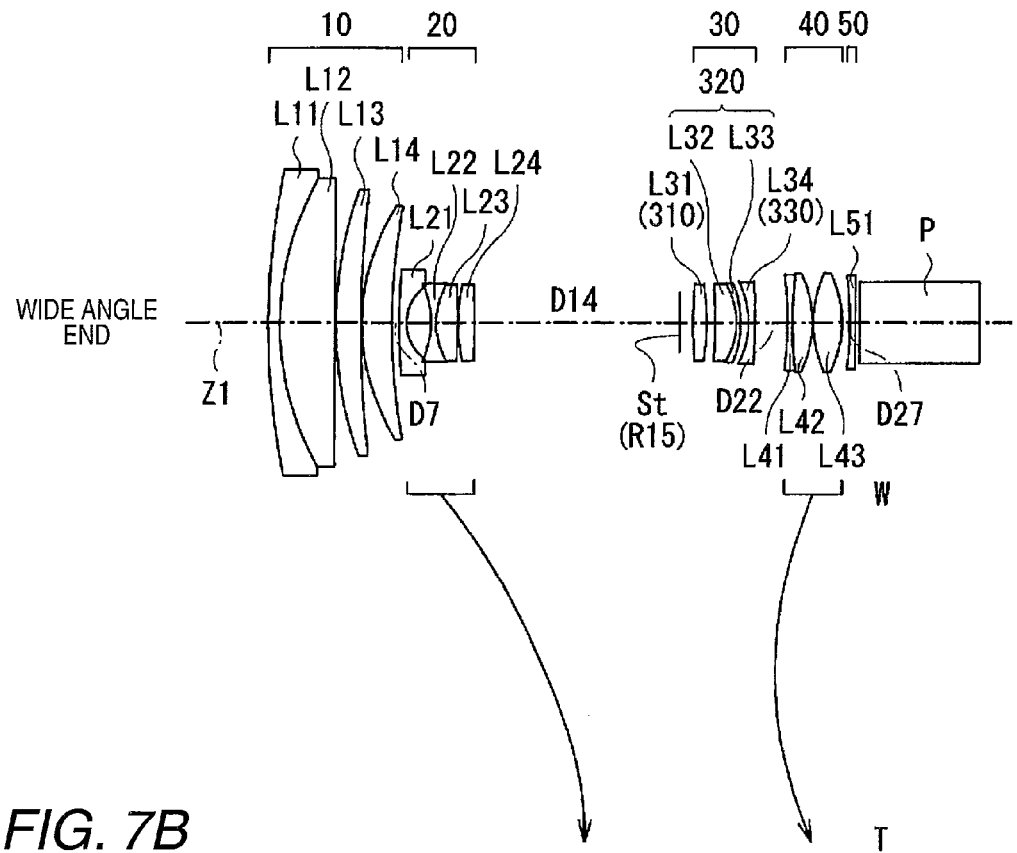
Figure 7B:
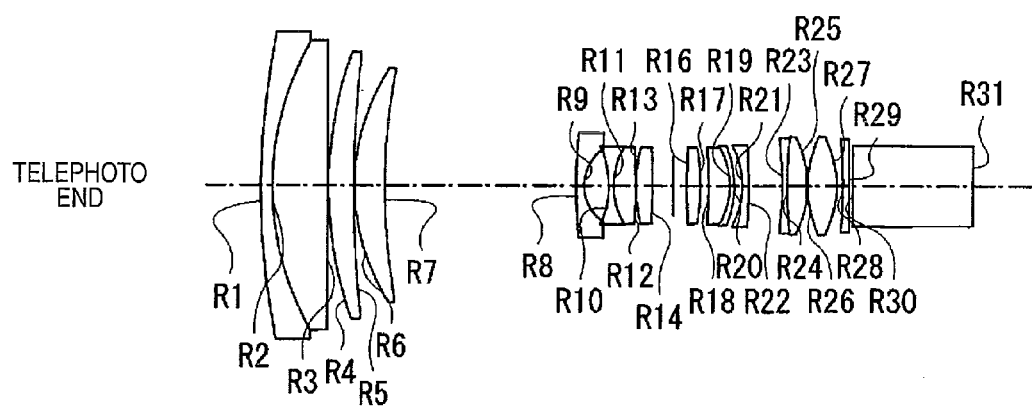
Figure 8A:
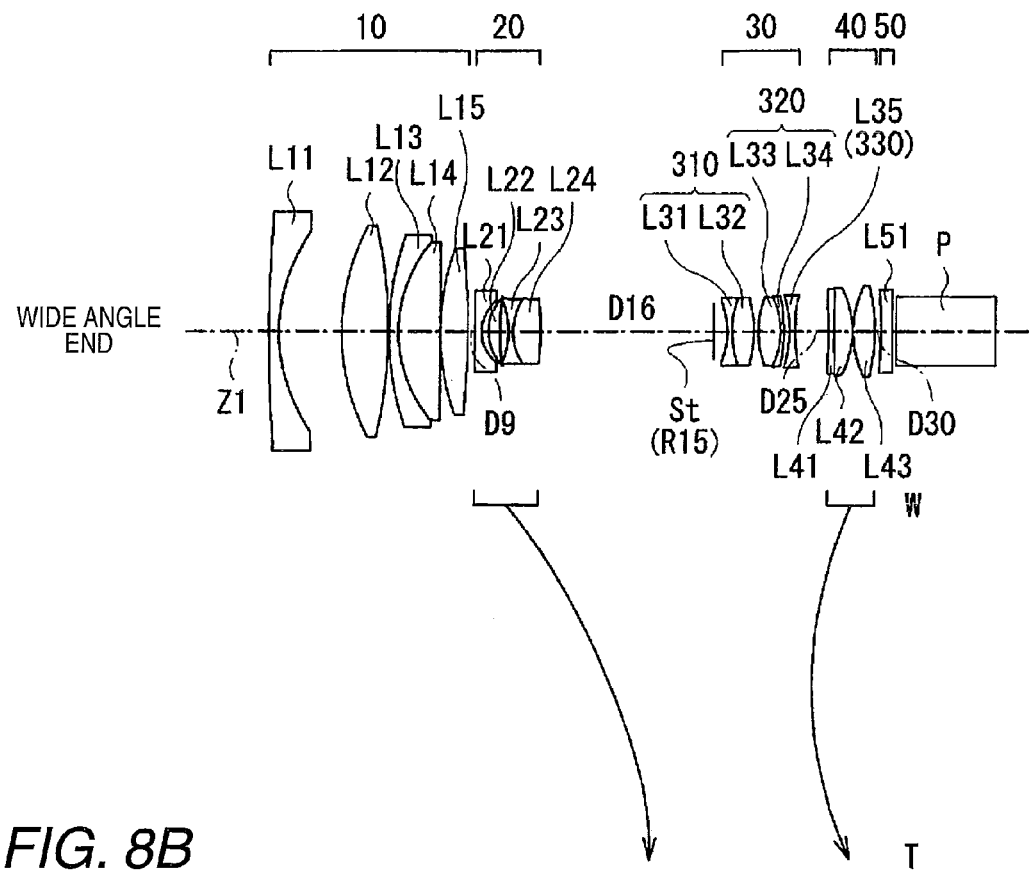
Figure 8B:
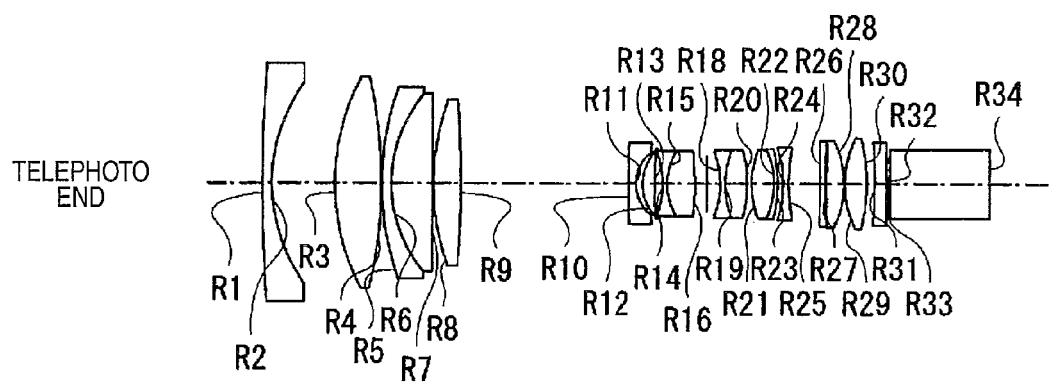
Figure 9A:
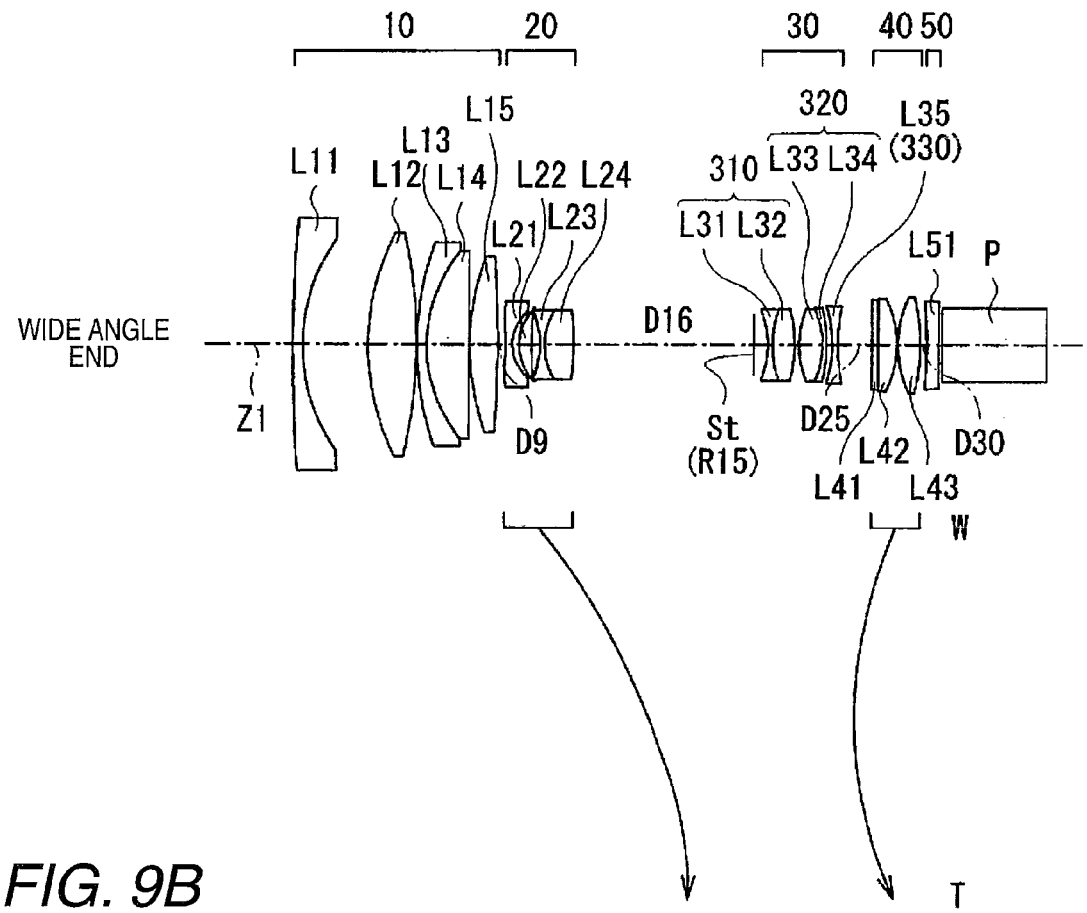
Figure 9B:
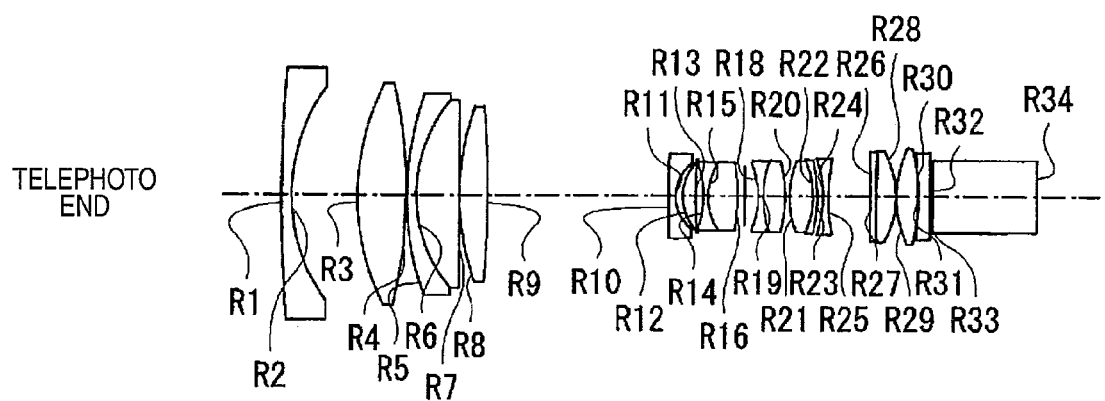
Figure 10A:
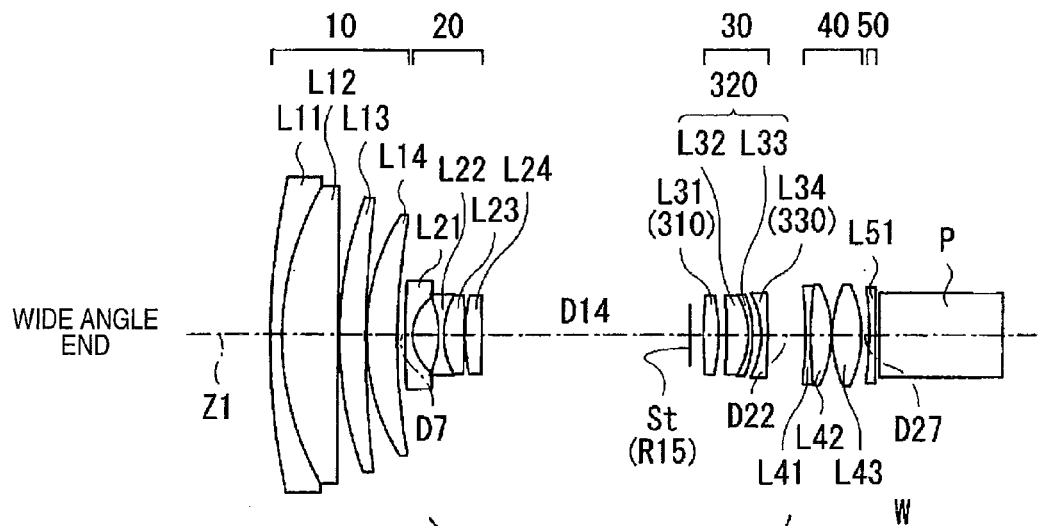
Figure 10B:
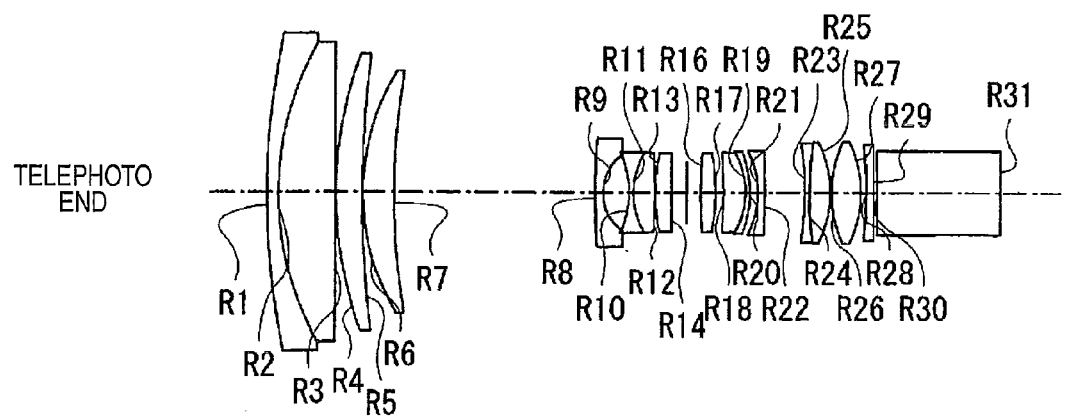

FIGS. 1A and 1B show a first structural example of a zoom lens in an exemplary embodiment according to the invention. Particularly, FIG. 1A shows an arrangement of lenses at a wide angle end, and FIG. 1B shows an arrangement of the lenses at a telephoto end. This structural example corresponds to a lens structure in a first example of numerical values which will be described below (FIGS. 11, 12A and 12B). FIGS. 2A, 2B to FIGS. 10A, 10B show a second to tenth structural examples and correspond to lens structures in a second to tenth examples of numerical values which will be described below.

In FIGS. 1A, 1B to 10A, 10B, sign Ri represents a radius of curvature of a surface of number i, provided that the numbers increasing in order from an object side to an image side (an image forming side) are affixed to R, wherein a surface of a constituent element at the closest side to the object is number 1. Sign Di represents a surface spacing on an optical axis Z1 between a surface of number i and a surface of number i plus one. The sign Di is affixed to only the surface spacing of a part which varies according to the power variation. It is to be noted that a basic structure is the same in all the structural examples, and so, the first example as shown in FIG. 1 will be described as the basic structure in the following description.

This zoom lens is used in a video camera or the like. This zoom lens includes a first group 10 having a positive refractive power, a second group 20 having a negative refractive power, an aperture diaphragm St, a third group 30 having a negative refractive power, and a fourth group 40 having a positive refractive power, in order from the object side along the optical axis Z1. In addition, a fifth group 50 having a negative refractive power is provided at the image side of the fourth group 40.

Imaging devices such as a CCD, CMOS (Complementary Metal Oxide Semiconductor) are disposed on an image forming plane of this zoom lens. An optical path deflecting prism P is disposed between the fifth group 50 and the imaging devices in correspondence with the video camera of the 3CCD system, for example. In addition, optical members in a plate-like shape such as a cover glass for protecting an imaging plane, an infrared ray cutting filter, etc. may be provided according to a structure of the camera on which the lens is to be mounted.

FIG. 52 shows an example of the camera to which this wide angle zoom lens is applied. This camera includes a camera body 1 and a lens 2 for the camera which is mounted on the camera body 1. In the camera body 1, there are provided an imaging device such as the CCD for outputting an imaging signal according to an image of an object which is formed by the lens 2 for the camera, a signal processing circuit for processing the imaging signal which has been outputted from the imaging device to produce an image, and a recording medium for recording the image which has been produced. The wide angle zoom lens in this embodiment is applied to this type of camera, as the lens 2 for camera.

This zoom lens is a zoom lens of the four or more group system in which on occasion of performing the power variation from the wide angle end to the telephoto end, the power variation is performed by moving the second group 20 to the image side along the optical axis, while the first group 10 and the third group 30 are fixed, and at the same time, correction of an image plane which has been formed and focusing control are conducted by moving the fourth group 40 along the optical axis. It is to be noted that the fifth group 50 is fixed. Along with the power variation from the wide angle end to the telephoto end, the second group 20 and the fourth group 40 move so as to draw a locus as shown by solid lines in FIG. 1. In FIGS. 1 to 10, sign W represents positions of the lenses at the wide angle end, and sign T represents positions of the lenses at the telephoto end.

The first group 10 has a three group-four lens structure including a cemented lens composed of a negative eleventh lens L11 and a positive twelfth lens L12, a positive thirteenth lens L13, and a positive fourteenth lens L14, in the order from the object side. However, in the structural example in FIG. 4, the first group 10 has a five group-six lens structure including a negative eleventh lens L11, a negative twelfth lens L12, a positive thirteenth lens L13, a cemented lens composed of a negative fourteenth lens L14 and a positive fifteenth lens L15, and a positive sixteenth lens L16. In the structural examples in FIGS. 5, 8 and 9, the first group 10 has a four group-five lens structure including a negative eleventh lens L11, a positive twelfth lens L12, a cemented lens composed of a negative thirteenth lens L13 and a positive fourteenth lens L14, and a positive fifteenth lens L15.

The second group 20 has a three group-four lens structure including a negative twenty-first lens L21, a cemented lens composed of a negative twenty-second lens L22 and a positive twenty-third lens L23, and a positive twenty-fourth lens L24, in the order from the object side. However, in the structural examples in FIGS. 4, 5, 8 and 9, the second group 20 has a three group-four lens structure including a negative twenty-first lens L21, a positive twenty-second lens L22, and a cemented lens composed of a negative twenty-third lens L23 and a positive twenty-fourth lens L24, in the order from the object side.

The third group 30 has a three group-four lens structure including a positive thirty-first lens L31, a cemented lens composed of a positive thirty-second lens L32 and a negative thirty-third lens L33, and a negative thirty-fourth lens L34, in the order from the object side. In this manner, the third group 30 includes at least two positive lenses and at least two negative lenses.

It would be preferable that the third group 30 has a thirty-first group 310 having a positive refractive power and including at least one positive lens, a thirty-second group 320 including a cemented lens composed of a positive lens and a negative lens, and a thirty-third group 330 including at least one negative lens, in the order from the object side. Specifically, the thirty-first lens L31 forms the thirty-first group 310, the thirty-second lens L32 and the thirty-third lens L33 form the thirty-second group 320, and the thirty-fourth lens L34 forms the thirty-third group 330.

However, in the structural examples in FIGS. 4A, 4B, 5A, 5B, 8A, 8B and 9A, 9B, the third group 30 has a three group-five lens structure including a cemented lens composed of a negative thirty-first lens L31 and a positive thirty-second lens L32, a cemented lens composed of a positive thirty-third lens L33 and a negative thirty-fourth lens L34, and a negative thirty-fifth lens L35, in the order from the object side. Among them, the thirty-first lens L31 and the thirty-second lens L32 form the thirty-first group 310, the thirty-third lens L33 and the thirty-fourth lens L34 form the thirty-second group 320, and the thirty-fifth lens L35 forms the thirty-third group 330.

Moreover, it would be preferable that the third group 30 having the above described structure satisfies the following conditional expressions (1) to (3). In these conditional expressions, f3 is a focal length of the third group, BF is a back focal length which may correspond to a distance from an image-side surface of the last lens having a refractive power to the image forming plane when the zoom lens includes a prism for deflecting the optical path, or an optical member such as a cover glass, or various filters which substantially do not have a refractive power, Fw is a focal length of the entire system at the wide angle end, Ft is a focal length of the entire system at the telephoto end, and ω is the largest half angle of view of the entire system.

$$|f3|/BF > 6.5 \quad (1)$$

$$10 \leq Ft/Fw \leq 15 \quad (2)$$

$$0.6 < \tan \omega < 0.85 \quad (3)$$

Further, it would be preferable that the third group 30 satisfies the following conditional expressions. In these conditional expressions, f31 is a focal length of the thirty-first group in the third group, and f32 is a focal length of the thirty-second group in the third group.

$$5.0 < f31/Fw < 12.0 \quad (4)$$

$$8.0 < f32/Fw < 20.0 \quad (5)$$

The fourth group 40 has a two group-three lens structure including a cemented lens composed of a negative forty-first lens L41 and a positive forty-second lens L42, and a positive forty-third lens L43 in order from the object side. Moreover, both surfaces of the positive forty-third lens L43 are formed as aspheric faces. In this manner, the fourth group includes at least two positive lenses, and at least one surface of these positive lenses is preferably formed as the aspheric surface. The fifth group 50 includes a negative fifty-first lens L51.

Operation and effects of the zoom lens having the above described structure will be described below.

In this zoom lens, the power variation is performed by moving the second group 20 along the optical axis, while the first group 10 and the third group 30 are fixed, and correction of the resulted image surface is performed by the fourth group 40. On this occasion, because the third group 30 which is the fixed group is provided with the negative power, a long back focal length can be secured. Moreover, because the third group 30 includes at least the two positive lenses and at least the two negative lenses, a power to be burdened on each of the lenses is reduced, and fluctuation of aberration caused by realizing the wide angle and the high magnifying power is depressed.

Further, because the thirty-first group including the positive lens and the thirty-second group including the cemented lens composed of the positive lens and the negative lens are arranged in the third group 30, chromatic aberration is favorably corrected, while a power to be burdened on the one positive lens is reduced.

Still further, because the fourth group 40 has at least the two positive lenses, and at least the one surface of these positive lenses is formed as the aspheric surface, spherical aberration is favorably corrected over an entire range of the variable power.

The conditional expression (1) defines relation between the focal length and the back focal length of the third group 30. Below a lower limit of the conditional expression (1), the power of the third group 30 is increased, which is not favorable, since the spherical aberration especially at the wide angle end is excessively corrected, although the long back focal length can be easily secured. Moreover, diameters of the lenses which are arranged at the image side become too large, which is disadvantageous for making the system compact. At the same time, the back focal length is secured more than required, which makes the entire system large-sized, and is not favorable.

The conditional expression (2) defines relation between the focal lengths at the wide angle end and at the telephoto end in the entire system, and the conditional expression (3) defines an appropriate angle of view. In this embodiment, the third group 30 has a relatively larger number of lenses, and hence, the aberration is favorably corrected in all areas of the variable power, even in case where the wide angle and the high variable power have been achieved. However, in the variable power ratio below the conditional expression (2) and in the angle of view below a lower limit of the conditional expression (3), the structure including a number of lenses is not favorable since it makes the entire system bulky, although this structure is advantageous for correcting the aberration. On the other hand, above an upper limit of the conditional expression (2), it is difficult to depress chromatic aberration and comatic aberration at the telephoto end, and hence, this is not favorable. Above the upper limit of the conditional expression (3), it is difficult to correct the various aberrations, and hence, this is not favorable. Moreover, by satisfying the following conditional expression (6), the entire system can be made compact and the various aberrations can be corrected advantageously.

$$10.5 \leq Ft/Fw \leq 14.5 \quad (6)$$

The conditional expressions (4) and (5) define relation of the thirty-first group 310 and the thirty-second group 320 in the third group 30 with respect to the focal length of the entire system. By satisfying the conditional expressions (4) and (5), the various aberrations are favorably corrected. On the contrary, above the upper limits of the conditional expressions (4) and (5), it is difficult to correct the spherical aberration and comatic aberration which occur at the wide angle end, and the image surface is inclined in a negative direction, which is not favorable. Below the lower limits of the conditional expressions (4) and (5), the powers of the thirty-first group 310 and the thirty-second group 320 are too much increased, and the radiuses of curvature on the surfaces at the object side and the image side become too small. In such case, it is necessary to make a center thickness larger for the purpose of securing a thickness of a peripheral edge, and the third group 30 becomes bulky, which is not favorable.

Further, because the fifth group 50 having the negative fifty-first lens L51 is arranged at the image side of the fourth group 40, the chromatic aberration can be advantageously corrected, and dust is prevented from entering into a lens barrel.

As described above, according to the zoom lens in this embodiment, the refractive power and the number of the lenses in the third group 30 which is the fixed group in the zoom lens of the four group system are appropriately set, and therefore, this zoom lens can be favorably used in the video camera for surveillance, and the lens system having the wide angle and high variable power ratio can be realized, while the long back focal length is secured.

EXAMPLES

Now, specific examples of numerical values of the zoom lens in this embodiment will be described below. In the following description, the first to tenth examples of the numerical values will be described together.

FIGS. 11, 12A and 12B show specific lens data (Example 1) corresponding to the structure of the zoom lens as shown in FIG. 1. Particularly, FIG. 11 shows its basic lens data, FIG. 12A shows the data concerning the aspheric surface, and FIG. 12B shows the data concerning zooming (data which vary with the power variation).

In the lens data as shown in FIG. 11, a column of surface number Si represents the number i (i=1 to 31) which is affixed to a surface of an element so as to increase in order from the object side to the image side, wherein the surface of the element closest to the object is number 1. A column of radius of curvature Ri represents a value of the radius of curvature of the surface of number i from the object side, corresponding to the sign Ri which is affixed in FIG. 1. Similarly, a column of surface spacing Di represents an on-axis spacing between the surface Si of number i from the object side and the surface Si+1 of number i+1. Numerical unit of the radius of curvature and the surface spacing Di is millimeter (mm). A column of Nej represents a refractive index at the e-line (wavelength 546.1 nm) of an optical element of number j (j=1 to 17) from the object side. A column of vdj represents a value of Abbe number at the d-line (wavelength 587.6 nm) of the optical element of number j (j=1 to 17) from the object side.

In the zoom lens according to Example 1, the second group 20 and the fourth group 40 move along the optical axis, and therefore, the surface spacings D7, D14, D22, and D 27 between the groups in the longitudinal direction are variable. FIG. 12(B) shows values at the wide angle end and the telephoto end, as the data of these surface spacings D7, D14, D22, and D 27 at the time of power variation. There are also shown values of a paraxial focal length f (mm), an F number (FNO.), and an angle of view 2ω (ω: a half angle of view) of the entire system at the wide angle end and the telephoto end. These values are shown as the values at the e-line.

In the lens data as shown in FIG. 11, sign "*" affixed to a left side of the surface number indicates that the lens surface has an aspheric shape. In the zoom lens in Example 1, a surface S8 at the object side of the twenty-first lens L21 in the second group 20 and both surfaces S26, S27 of the forty-third lens L43 in the fourth group 40 have the aspheric surfaces. As the radiuses of curvature of these aspheric surfaces, numerical values of the radiuses of curvature near the optical axis are shown.

In the numerical values which are shown as the aspheric surface data in FIG. 12A, sign "E" indicates that a value after the sign E is "an exponent" in base 10, and that the numerical value before the sign "E" should be multiplied by the value expressed by an exponential function in base 10. For example, "1.0E-02" means "$1.0 \times 10^{-2}$".

As the aspheric surface data, there are shown values of factors $RB_i$ and KA in a formula of the aspheric shape which is represented by the following formula (A). More specifically, Z is a length (mm) of a perpendicular line extended from a point on the aspheric surface at a height h from the optical axis to a contact plane at an apex of the aspheric surface (a plane perpendicular to the optical axis). The respective aspheric surfaces are shown as an aspheric surface factor $PB_i$, by effectively using the factors $RA_3$ to $RA_{10}$ of a third order to a tenth order.

$$Z = C \cdot h^2 / \{1 + (1 - KA \cdot C^2 \cdot h^2)\} + RA_i \cdot h^i \quad (A)$$

(i=3 to n, n: an integer of 3 or more)

wherein

Z: a depth of the aspheric surface (mm)

h: a distance (height) from the optical axis to the lens surface (mm)

KA: a conical constant

C: a paraxial curvature=1/R (R: a radius of paraxial curvature)

$RA_i$: an aspheric surface factor of the i order

In the same manner as the zoom lens according to Example 1 as described above, lens data of the zoom lens according to Example 2 are shown in FIGS. 13, 14A and 14B. In the same manner, lens data of the zoom lens according to Example 3 are shown in FIGS. 15, 16A and 16B. In the same manner, lens data of the zoom lens according to Example 4 are shown in FIGS. 17, 18A and 18B. In the same manner, lens data of the zoom lens according to Example 5 are shown in FIGS. 19, 20A and 20B. In the same manner, lens data of the zoom lens according to Example 6 are shown in FIGS. 21, 22A and 22B. In the same manner, lens data of the zoom lens according to Example 7 are shown in FIGS. 23, 24A and 24B. In the same manner, lens data of the zoom lens according to Example 8 are shown in FIGS. 25, 26A and 26B. In the same manner, lens data of the zoom lens according to Example 9 are shown in FIGS. 27, 28A and 28B. In the same manner, lens data of the zoom lens according to Example 10 are shown in FIGS. 29, 30A and 30B.

FIG. 31 shows the values concerning the above described conditional expressions (1) to (5) which have been obtained in the respective examples. As seen in FIG. 31, the values are within the ranges of the numerical values of the conditional expressions related to the zoom lenses in the respective examples.

Figure 32:
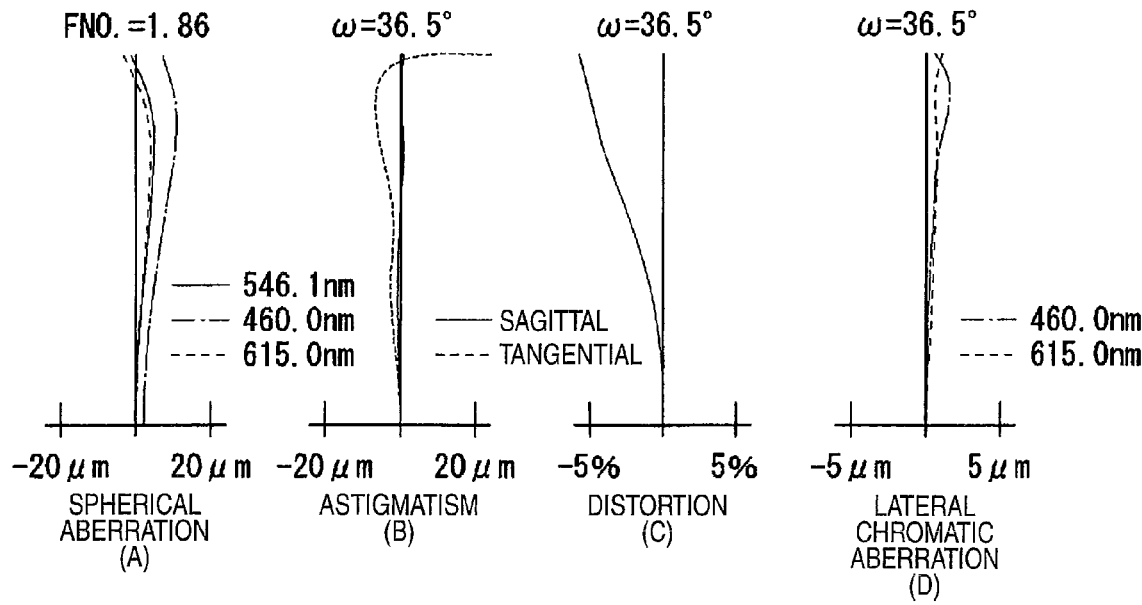
FIG. 32 is aberration diagrams showing the aberrations of the zoom lens in Example 1 at the wide angle end, in which (A) shows spherical aberration, (B) shows astigmatizm, (C) shows distortion, and (D) shows lateral chromatic aberration.
Figure 33:
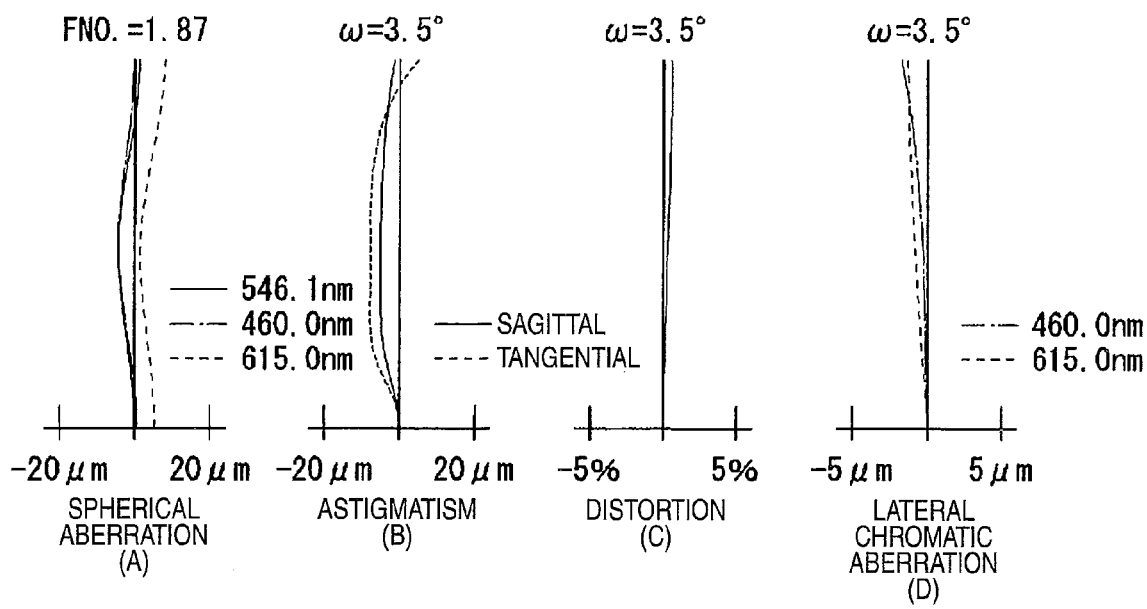
FIG. 33 is aberration diagrams showing the aberrations of the zoom lens in Example 1 at the telephoto end, in which (A) shows the spherical aberration, (B) shows the astigmatizm, (C) shows the distortion, and (D) shows the lateral chromatic aberration.

FIG. 32 is diagrams respectively showing spherical aberration, astigmatism, distortion, and lateral chromatic aberration at the wide angle end in the zoom lens according to Example 1. FIG. 33 is diagrams respectively showing similar aberrations at the telephoto end. It is to be noted that the spherical aberration, astigmatism, and distortion are shown with respect to a wavelength of 546.1 nm (the e-line) as a reference wavelength. However, aberrations at the wavelength of 460.0 nm (a one-dot chain line) and at the wavelength of 615.0 nm (a chain line) are also shown in the charts of the spherical aberration. In the charts of the astigmatism, a solid line shows a sagittal direction, and a broken line shows a tangential direction. In the charts of the lateral chromatic aberration, aberrations at the wavelength of 460.0 nm (a one-dot chain line) and at the wavelength of 615.0 nm (a chain line) are shown. FNO represents an F number, and ω represents a half angle of view.

Figure 34:
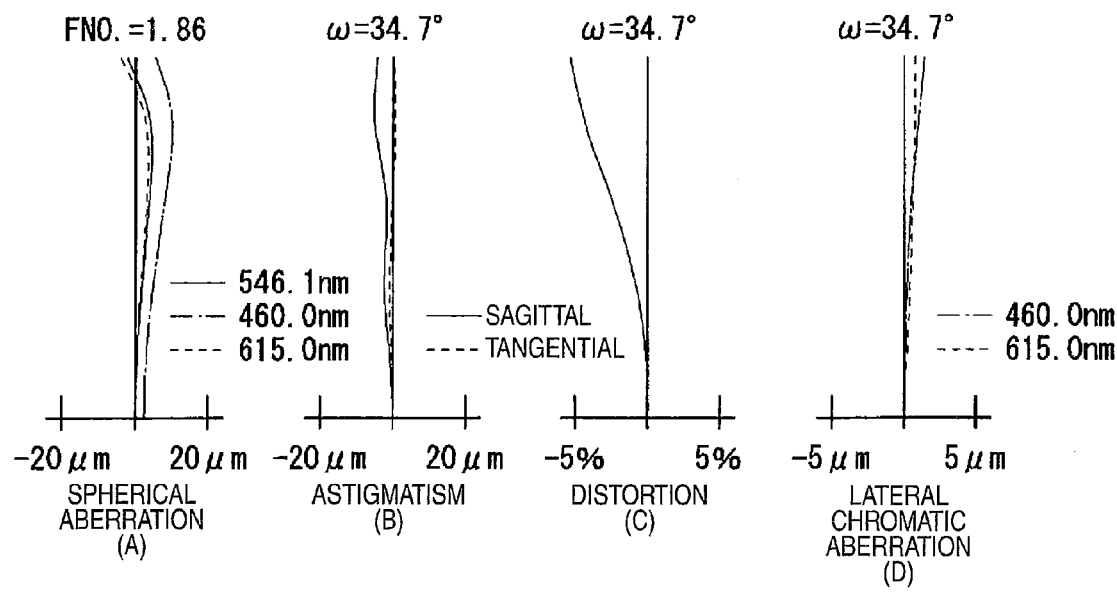
FIG. 34 is aberration diagrams showing the aberrations of the zoom lens in Example 2 at the wide angle end, in which (A) shows the spherical aberration, (B) shows the astigmatizm, (C) shows the distortion, and (D) shows the lateral chromatic aberration.
Figure 35:
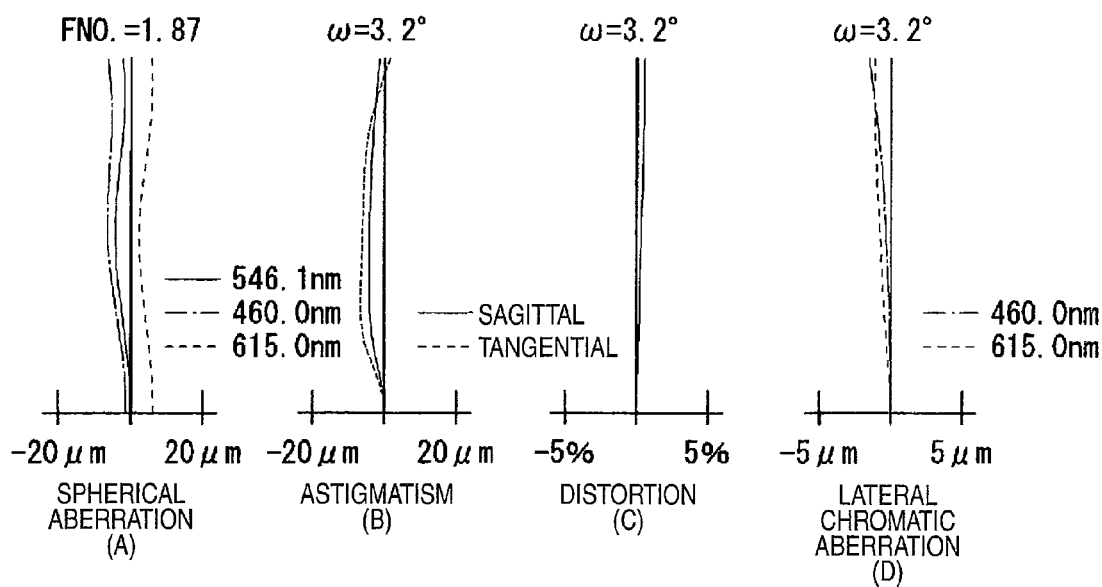
FIG. 35 is aberration diagrams showing the aberrations of the zoom lens in Example 2 at the telephoto end, in which (A)

In the same manner, the aberrations in the zoom lens according to Example 2 are shown in FIG. 34 (at the wide angle end), and in FIG. 35 (at the telephoto end). In the same manner, the aberrations in the zoom lens according to Example 3 are shown in FIG. 36 (at the wide angle end), and in FIG. 37 (at the telephoto end). In the same manner, the aberrations in the zoom lens according to Example 4 are shown in FIG. 38 (at the wide angle end), and in FIG. 39 (at the telephoto end). In the same manner, the aberrations in the zoom lens according to Example 5 are shown in FIG. 40 (at the wide angle end), and in FIG. 41 (at the telephoto end). In the same manner, the aberrations in the zoom lens according to Example 6 are shown in FIG. 42 (at the wide angle end), and in FIG. 43 (at the telephoto end). In the same manner, the aberrations in the zoom lens according to Example 7 are shown in FIG. 44 (at the wide angle end), and in FIG. 45 (at the telephoto end). In the same manner, the aberrations in the zoom lens according to Example 8 are shown in FIG. 46 (at the wide angle end), and in FIG. 47 (at the telephoto end). In the same manner, the aberrations in the zoom lens according to Example 9 are shown in FIG. 48 (at the wide angle end), and in FIG. 49 (at the telephoto end). In the same manner, the aberrations in the zoom lens according to Example 10 are shown in FIG. 50 (at the wide angle end), and in FIG. 51 (at the telephoto end).

As understood from the numerical data and the charts of the aberrations as described above, the aberrations are favorably corrected, and a wide angle of view of about 70° can be realized in the respective examples. As the results, it is possible to realize the zoom lens having the wide angle of view and the high variable power ratio, securing the long back focal length, which can be favorably used in the video camera or the like.

The invention is not limited to the above described embodiments and examples, but various modifications can be made. For example, the values of the radiuses of curvature, surface spacings, refractive indices and so on of the respective lens components are not limited to the values shown in the above described examples of the numerical values, but other values can be adopted.

What is claimed is:

1. A zoom lens comprising: in order from an object side thereof, a first group having a positive refractive power;

a second group having a negative refractive power;

a stop;

a third group having a negative refractive power, the third group including at least two positive lenses and at least two negative lenses; and a fourth group having a positive refractive power, wherein power variation from a wide angle end to a telephoto end of the zoom lens is performed by moving the second group to an image side along an optical axis thereof, while the first group and the third group are fixed, and correction of an image plane caused by the power variation and focusing is performed by moving the fourth group along the optical axis.

2. The zoom lens according to claim 1, wherein the third group includes a first sub-group having a positive refractive power and including at least one positive lens, a second sub-group including a cemented lens of a positive lens and a negative lens, and a third sub-group including at least one negative lens, in order from the object side.

3. The zoom lens according to claim 1, wherein the fourth group includes at least two positive lenses, and at least one surface of the at lease two positive lenses is an aspheric surface.

4. The zoom lens according to claim 1, satisfying conditional expressions:

$$|f3|/BF > 6.5 \quad (1)$$

$$10 \leq Ft/Fw \leq 15 \quad (2)$$

$$0.6 < \tan \omega < 0.85 \quad (3)$$

wherein
- f3 is a focal length of the third group,
- BF is a back focal length of the zoom lens,
- Fw is a focal length of the zoom lens at the wide-angle end,
- Ft is a focal length of the zoom lens at the telephoto end, and
- ω is a largest half angle of view of the zoom lens.

5. The zoom lens according to claim 1, further comprising a fifth group on the image side of the fourth group, the fifth group including at least one negative lens and having a negative refractive power, and the fifth group being fixed during the power variation.

6. The zoom lens according to claim 2, wherein the fourth group includes at least two positive lenses, and at least one surface of the at lease two positive lenses is an aspheric surface.

7. The zoom lens according to claim 2, satisfying conditional expressions:

$$|f3|/BF > 6.5 \quad (1)$$

$$10 \leq Ft/Fw \leq 15 \quad (2)$$

$$0.6 < \tan \omega < 0.85 \quad (3)$$

wherein
- f3 is a focal length of the third group,
- BF is a back focal length of the zoom lens,
- Fw is a focal length of the zoom lens at the wide-angle end,
- Ft is a focal length of the zoom lens at the telephoto end, and
- ω is a largest half angle of view of the zoom lens.

8. The zoom lens according to claim 2, satisfying following conditional expressions:

$$5.0 < f31/Fw < 12.0 \quad (4)$$

$$8.0 < f32/Fw < 20.0 \quad (5)$$

wherein
- f31 is a focal length of the first sub-group in the third group,
- f32 is a focal length of the second sub-group in the third group, and
- Fw is a focal length of the zoom lens at the wide-angle end.

9. The zoom lens according to claim 2, further comprising a fifth group on the image side of the fourth group, the fifth group including at least one negative lens and having a negative refractive power, and the fifth group being fixed during the power variation.

10. The zoom lens according to claim 6, satisfying following conditional expressions:

$$5.0 < f31/Fw < 12.0 \quad (4)$$

$$8.0 < f32/Fw < 20.0 \quad (5)$$

wherein
- f31 is a focal length of the first sub-group in the third group,
- f32 is a focal length of the second sub-group in the third group, and
- Fw is a focal length of the zoom lens at the wide-angle end.

11. The zoom lens according to claim 7, satisfying following conditional expressions:

$$5.0 < f31/Fw < 12.0 \quad (4)$$

$$8.0 < f32/Fw < 20.0 \quad (5)$$

wherein
- f31 is a focal length of the first sub-group in the third group,
- f32 is a focal length of the second sub-group in the third group, and
- Fw is a focal length of the zoom lens at the wide-angle end.

12. An imaging apparatus comprising:
a zoom lens according to claim 1, and
an imaging device for outputting an imaging signal corresponding to an optical image formed by the zoom lens.

13. An imaging apparatus comprising:
a zoom lens according to claim 2, and
an imaging device for outputting an imaging signal corresponding to an optical image formed by the zoom lens.

* * * * *